United States Patent
Yumoto et al.

(10) Patent No.: US 9,417,747 B2
(45) Date of Patent: Aug. 16, 2016

(54) TOUCH SENSOR PANEL, TOUCH PANEL SYSTEM AND ELECTRONIC EQUIPMENT

(71) Applicant: SHARP KABUSHIKI KAISHA, Osaka-shi, Osaka (JP)

(72) Inventors: Manabu Yumoto, Osaka (JP); Shunsuke Nagasawa, Osaka (JP); Yusuke Kanazawa, Osaka (JP); Qian Yan, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/414,056

(22) PCT Filed: Jul. 9, 2013

(86) PCT No.: PCT/JP2013/004234
§ 371 (c)(1),
(2) Date: Jan. 9, 2015

(87) PCT Pub. No.: WO2014/010228
PCT Pub. Date: Jan. 16, 2014

(65) Prior Publication Data
US 2015/0205405 A1   Jul. 23, 2015

(30) Foreign Application Priority Data
Jul. 11, 2012 (JP) .................. 2012-155712

(51) Int. Cl.
*G06F 3/045* (2006.01)
*G06F 3/044* (2006.01)
*G06F 3/041* (2006.01)
*G06F 3/0354* (2013.01)

(52) U.S. Cl.
CPC ............ *G06F 3/044* (2013.01); *G06F 3/03547* (2013.01); *G06F 3/0416* (2013.01); *G06F 2203/0339* (2013.01); *G06F 2203/04101* (2013.01); *G06F 2203/04111* (2013.01); *G06F 2203/04112* (2013.01)

(58) Field of Classification Search
CPC ................................ G06F 3/044; G06F 3/0416
USPC .................................................. 345/173–174
See application file for complete search history.

(56) References Cited

U.S. PATENT DOCUMENTS

| 2010/0110038 A1* | 5/2010 | Mo ........................ G06F 3/044 345/174 |
| 2011/0193796 A1 | 8/2011 | Cho et al. |
| 2012/0127123 A1* | 5/2012 | Onishi .................... G06F 3/044 345/174 |

FOREIGN PATENT DOCUMENTS

| JP | 2011-39662 A | 2/2011 |
| JP | 2011-165159 A | 8/2011 |
| JP | 2012-113485 A | 6/2012 |

* cited by examiner

*Primary Examiner* — Temesgh Ghebretinsae
*Assistant Examiner* — Kwin Xie
(74) *Attorney, Agent, or Firm* — Birch, Stewart, Kolasch & Birch, LLP

(57) ABSTRACT

In a touch sensor panel 10 for inputting a position by a touch operation to a predetermined region, a plurality of drive lines DL disposed in one direction and a plurality of sense patterns SL disposed in another direction intersect each other and an electrode size of an electrode of a sense pattern (sense electrode pattern) in one direction disposed between adjacent intersections is switched between at least two electrode sizes of large and small. The configuration enables power consumption to be small while maintaining detection precision of a touched position.

5 Claims, 22 Drawing Sheets

TOUCH SENSOR PANEL, TOUCH PANEL SYSTEM AND ELECTRONIC EQUIPMENT

TECHNICAL FIELD

The present invention relates to a touch sensor panel installed on a display screen of a display device to detect an input position, a touch panel system for detecting an input position by using the same, and electronic equipment using the system as a position inputting device.

BACKGROUND ART

Currently, a touch panel system is rapidly being installed into various electronic equipments including mobile information equipments such as smart phones and vending machines such as automatic ticket machines.

An example of a basic configuration of a conventional touch panel system, as a position inputting device, installed on a display screen of a display device is explained while referring to FIG. 21.

FIG. 21 is a structural drawing of a conventional display device with a position inputting device, having a conventional touch panel system installed as the position inputting device.

In FIG. 21, a conventional touch panel system 100 comprises: a touch sensor panel 101 as a projection-type position inputting device having an electrostatic capacitance; a drive line driving section 110 for generating a state signal of electrostatic capacitance in sense line SL that three-dimensionally intersects with drive lines DL in a plan view by sequentially driving the drive lines DL in the touch sensor panel 101; a touched position detecting section 120 for detecting a touched position that is in contact with or in the proximity of a display screen P by processing a signal for a change in the state signal of electrostatic capacitance generated on the sense lines SL at a position where the drive lines DL are driven by the drive line driving section 110, and a host terminal 105 for controlling the drive line driving section 110 and the touched position detecting section 120. FIG. 21 illustrates a case in which the drive lines DL and the sense lines SL vertically and intersect with each other in a plan view. However, the lines may intersect in a plan view at an angle other than orthogonal.

The touch sensor panel 101 is provided on the display screen P of a liquid crystal panel. Further, the touch sensor panel 101 is provided with a plurality of parallel drive lines DL provided for each predetermined interval along the display screen P of the liquid crystal panel, and a plurality of parallel sense lines SL which intersect in a plan view with the drive lines DL provided along the display screen P for each predetermined interval. An electrode for detecting capacitance is provided for each line. The drive lines DL and the sense lines SL are made of, for example, a transparent material.

The touched position detecting section 120 comprises: an amplifying circuit 121 for amplifying a state signal of electrostatic capacitance generated on the sense lines SL; a signal obtaining section 122 for obtaining the state signal of electrostatic capacitance amplified by the amplifying circuit 121 for outputting the signal in a time division; an A/D converting section 123 for converting an analog signal outputted by the signal obtaining section 122 to a digital signal; a decoding section 124 for finding the amount of change in a capacitance distribution within the display screen P based on the digital signal converted by the A/D converting section 123; and a touched position calculating section 125 for calculating a touched position on the display screen P based on the amount of change in the capacitance distribution found by the decoding section 124 to generate touched position information indicating the touched position.

The host terminal 105 controls the drive lines DL driven by the drive line driving section 110. Further, the host terminal 105 controls the sense lines SL for processing a state signal of electrostatic capacitance by the touched position detecting section 120 via the drive lines DL.

FIG. 22 is a partially enlarged plan view of a touch panel showing an example of a shape of electrodes of the drive lines DL and sense lines SL of FIG. 21.

As shown in FIG. 22, the following are formed on the touch panel 101: a drive line electrode pattern 102 comprising a plurality of rhombus shaped large-area pad sections that extend in a first direction shown by arrow Y, where a plurality of the patterns are arranged in a second direction shown by arrow X; and a sense line electrode pattern 103 comprising a plurality of rhombus shaped large area pad sections that extend in a second direction shown by arrow X, where a plurality of the patterns are arranged in the first direction shown by arrow Y to intersect (herein, orthogonally) with the drive lines DL.

When the drive lines DL are sequentially driven by the drive line driving section 110, a state signal of electrostatic capacitance is generated in the sense lines SL that intersect the drive lines DL in a plan view. The state signal is a signal indicating the state of electrostatic capacitance at a touched position on the above-described intersecting section in a plan view or a section in the proximity within the display screen P (hereinafter, referred to as detection region A).

The state signal would have a value corresponding to electrostatic capacitance produced between the drive lines DL and the sense lines SL. Such a signal indicates whether there is contact or proximity to the detection region A within the display screen P. e.g., the presence of a contact or proximity to the detection region A or separation distance between the detection region A and a pointer. Electrostatic capacitance becomes smaller when in contact with or in the proximity of the detection region A.

Next, an example of a basic operation of the conventional touch panel system 100 is explained with the configuration described above. Herein, a single run operation is explained, where the touch panel system 100 detects a touched position in contact with or in the proximity of the display screen P.

First, the drive line driving section 110 sequentially drives the plurality of drive lines DL so that a state signal of electrostatic capacitance is generated in the sense lines SL.

Next, the amplifying circuit 121 amplifies the state signal of electrostatic capacitance generated in the sense lines SL.

Subsequently, the signal obtaining section 122 outputs the state signal of electrostatic capacitance amplified by the amplifying circuit 121 in a time division while matching the timing of driving by the drive line driving section 110. The operational timing of each of the drive line driving section 110, amplifying circuit 121 and signal obtaining section 122 is controlled by the host terminal 105. Specifically, the sense lines SL for processing a state signal of electrostatic capacitance is controlled via the drive lines DL to be driven.

The A/D converting section 123 then converts an analog signal output by the signal obtaining section 122 to a digital signal with a predetermined number of bits.

Furthermore, the decoding section 124 finds the amount of change in a capacitance distribution within the display screen P based on the digital signal converted by the A/D converting section 123. For example, the decoding section 124 obtains a digital signal when a touch subject is not present on the display screen P, prior to the detection of a touched position, to find in advance a capacitance distribution when a touch subject is not present on the display screen P. The decoding section 124 obtains a digital signal upon detection of a pointer to find a capacitance distribution and compares the distribution to the capacitance distribution, which was found in advance for a case where a touch subject is not present, to find the amount of change in the capacitance distribution (amount of change in electrostatic capacitance due to a touch subject).

The touched position calculating section 125 calculates a position of a touch subject on the display screen P based on the amount of change in the capacitance distribution found by the decoding section 124 to generate touched position information. For example, the touched position calculating section 125 determines that a touch subject is present at a section where the amount of change in electrostatic capacitance within the display screen P is large beyond a detection threshold and calculates the position of the touch subject on the display screen P. The touched position calculating section 125 may generate touched position information indicating that calculation could not be performed when a position of a touch subject cannot be calculated.

In the conventional touch panel system 100 of this specific example, position detection of a touch subject is continuously run by repeating the aforementioned run operation.

The host terminal 105 controls each of the drive line driving section 110 and the touched position detecting section 120 while referring to the touched position information output by the touched position calculating section 125 as needed. Further, the host terminal 105 controls the frame rate, which is the number of detections of a touch subject run per unit time (e.g., one second) in touch subject detection.

As stated above, in the basic example of the touch panel system 100 shown in FIG. 21, each of the drive lines DL to be driven by the drive line driving section 110, the sense lines SL for processing a state signal of electrostatic capacitance by the touched position detecting section 120 via the drive lines DL, the frame rate, the detection threshold (detection sensitivity) and the like can be optionally set by the host terminal 105 control.

As described above, the touch panel system 100 detects the amount of change in a sense line capacitance distribution to detect a touched position.

Meanwhile, as the touch sensor panel 101 becomes larger, the amount of computation to find a touched position increases so that consumed power and associated devices, such as an amplifier, tend to be large. Thus, there is a need to keep power consumption and the size of associated devices small.

In this regard, Patent Literature 1, it is possible to keep power consumption and size of associated devices small by sampling scanning to reduce the amount of processing for a common two-dimensional sense pattern.

CITATION LIST

Patent Literature

Patent Literature 1: Japanese Laid-Open Publication No. 2011-242908

SUMMARY OF INVENTION

Technical Problem

In the above-described conventional touch panel system disclosed in Patent Literature 1, it is possible to keep power consumption small by sampling scanning to reduce the amount of processing for a common two-dimensional sense pattern. However, there is an issue of detection precision of a touched position decreasing due to sampling scanning.

The present invention solves the above-described conventional issue. The objective of the present invention is to provide a touch sensor panel capable of reducing power consumption while maintaining detection precision of a touched position, a touch panel system using the same, and an electronic equipment using the system.

Solution to Problem

A touch sensor panel for inputting a position by a touch operation to a predetermined region according to the present invention is provided, where the touch sensor panel is configured such that a plurality of drive lines disposed in one direction and a plurality of sense lines disposed in another direction intersect each other and an electrode size of at least one of an electrode of the drive lines in the one direction and an electrode of the sense lines in the another direction disposed between adjacent intersections is switchable between at least two electrode sizes of large and small, thereby achieving the objective described above.

Preferably, in the touch sensor panel according to the present invention, at least one of the electrode of the drive lines and the electrode of the sense lines is divided into a plurality of portions constituting a plurality of sub-drive lines and/or a plurality of sub-sense lines and at least one of the plurality of sub-drive lines and the plurality of sub-sense lines is configured to be switchable.

Still preferably, in the touch sensor panel according to the present invention, the plurality of divided sub-drive lines and/or the plurality of divided sub-sense lines are simultaneously used for every number of predetermined lines.

Still preferably, in the touch sensor panel according to the present invention, regarding simultaneous use of the plurality of divided sub-drive lines and/or the plurality of divided sub-sense lines, the lines are used while not being spaced apart from one another when using the plurality of sub-drive lines and/or the plurality of sub-sense lines.

Still preferably, in the touch sensor panel according to the present invention, regarding simultaneous use of the plurality of divided sub-drive lines and/or the plurality of divided sub-sense lines, the lines are used while being spaced apart from one another when simultaneously using the plurality of sub-drive lines and/or the plurality of sub-sense lines.

Still preferably, in the touch sensor panel according to the present invention, the maximum size of the large electrode size corresponds to half a size of a maximum electrode region within four intersections adjacent to one another.

Still preferably, in the touch sensor panel according to the present invention, the small electrode size is an electrode size that is 1/9 or more and 8/9 or less of the maximum electrode size.

Still preferably, in the touch sensor panel of the present invention, wherein the electrode size to which the switching is possible is at least the two electrode sizes of large and small among 1/4, 2/4, 3/4 and 4/4 with respect to all sizes of an electrode divided into four.

Still preferably, in the touch sensor panel according to the present invention, the electrode size to which the switching is possible is three electrode sizes of 1/4, 2/4 and 4/4 or two electrode sizes of 1/4 and 4/4 with respect to all sizes of an electrode divided into four.

Still preferably, in the touch sensor panel according to the present invention, the electrode size to which the switching is possible is the two electrode sizes of large and small of 1/2 and 2/2 with respect to all sizes of an electrode divided into two.

Still preferably, in the touch sensor panel according to the present invention, the electrode size to which the switching is possible is at least the two electrode sizes of large and small among 1/9, 2/9, 3/9, 4/9, 5/9, 6/9, 7/9, 8/9 and 9/9 with respect to all sizes of an electrode divided into nine.

Still preferably, in the touch sensor panel according to the present invention, the electrode size to which the switching is possible is three electrode sizes of 1/9, 4/9 and 9/9 or two electrode sizes of 1/9 and 9/9 with respect to all sizes of an electrode divided into nine.

Still preferably, in the touch sensor panel according to the present invention, the electrode size to which the switching is possible is 1/2, 2/2, 3/2, 4/2, 5/2, 6/2 . . . [number of constituent lines×2]/2 with respect to all sizes of an electrode divided into two.

Still preferably, in the touch sensor panel according to the present invention, the electrode size to which the switching is possible is 1/4, 2/4, 3/4, 4/4, 5/4, 6/4 . . . [number of constituent lines×4]/4 with respect to all sizes of an electrode divided into four.

Still preferably, in the touch sensor panel according to the present invention, the electrode size to which the switching is possible is 1/9, 2/9, 3/9, 4/9, 5/9, 6/9, 7/9, 8/9, 9/9, 10/9, 11/9, 12/9 . . . [number of constituent lines×9]/9 with respect to all sizes of an electrode divided into nine.

Still preferably, in the touch sensor panel according to the present invention, regarding the disposition of the switched electrode, a switched divided electrode is used without each part of the divided electrode being spaced apart from one another by another electrode.

Still preferably, in the touch sensor panel according to the present invention, regarding the disposition of the switched electrode, a switched divided electrode is used while the divided electrode are spaced apart from one another.

Still preferably, in the touch sensor panel according to the present invention, regarding simultaneously using the plurality of divided sub-drive lines and/or the plurality of divided sub-sense lines, an interval between the lines is one of 1-20 lines or a plurality of lines when using the plurality of sub-drive lines and/or the plurality of sub-sense lines and the lines are used while being spaced apart from one another.

Still preferably, in the touch sensor panel according to the present invention, each shape of the electrodes of the drive lines and the sense lines is a triangle, square or a rhombus.

Still preferably, in the touch sensor panel according to the present invention, each electrode of the drive lines and the sense lines is a transparent electrode.

Still preferably, in the touch sensor panel according to the present invention, a material of the transparent electrode is ITO (Indium-Tin-Oxide).

Still preferably, in the touch sensor panel according to the present invention, each electrode of the drive lines and the sense lines is a metal mesh.

Still preferably, a touch panel system according to the present invention comprises the touch sensor panel according to the present invention; a touched position detecting section for estimating or detecting a capacitance value after the capacitance value of electrostatic capacitance from a plurality of sense lines of the touch sensor panel is amplified with an amplifier to detect a touched position.

A touch panel system according to the present invention is as described above, thereby achieving the objective described above.

Preferably, the touch panel system according to the present invention has a sensor size switching section that is provided between the plurality of sense lines and the touched position detecting section and switches an electrode size of the sense lines between the at least two electrode size of large and small.

Still preferably, in the touch panel system according to the present invention, the sensor size switching section has a size switching controlling section for controlling switching between the at least two electrode sizes of large and small in accordance with a size of a pointer in contact with or in the proximity of a surface of the touch sensor panel.

Still preferably, in the touch panel system according to the present invention, the size switching controlling section switches to a small electrode size for a pointer with a larger size in contact with or in the proximity of the surface of the touch sensor panel, and switches to a large electrode size for a pointer with a smaller size in contact with or in the proximity of the surface.

Still preferably, in the touch panel system according to the present invention, the size switching controlling section switches feedback capacity of the amplifier in response to the switching of the sensor size switching section.

An electronic equipment according to the present invention using the touch panel system according to the present invention on a display screen of a display device as a position inputting device, thereby achieving the objective described above.

Preferably, in the electronic equipment according to the present invention, the display device is a liquid crystal display, plasma display, organic EL display or a field discharge display.

With the configuration described above, the functions of the present invention will be described hereinafter.

In the present invention, a touch sensor panel for inputting a position by a touch operation to a predetermined region is configured such that a plurality of drive lines disposed in one direction and a plurality of sense lines disposed in another direction intersect each other and the electrode size of at least one of an electrode of the drive lines in one direction and an electrode of the sense lines in another direction disposed between adjacent intersections is switchable between at least two electrode sizes of large and small.

Thereby, power consumption is further reduced while maintaining detection precision of a touched position.

Advantageous Effects of Invention

According to the present invention as described above, since the electrode size of at least one of an electrode of drive lines in one direction and an electrode of sense lines in another direction is configured to be switchable between at least two electrode sizes of large and small, power consumption can be further reduced while maintaining detection precision of a touched position.

Figure 1:
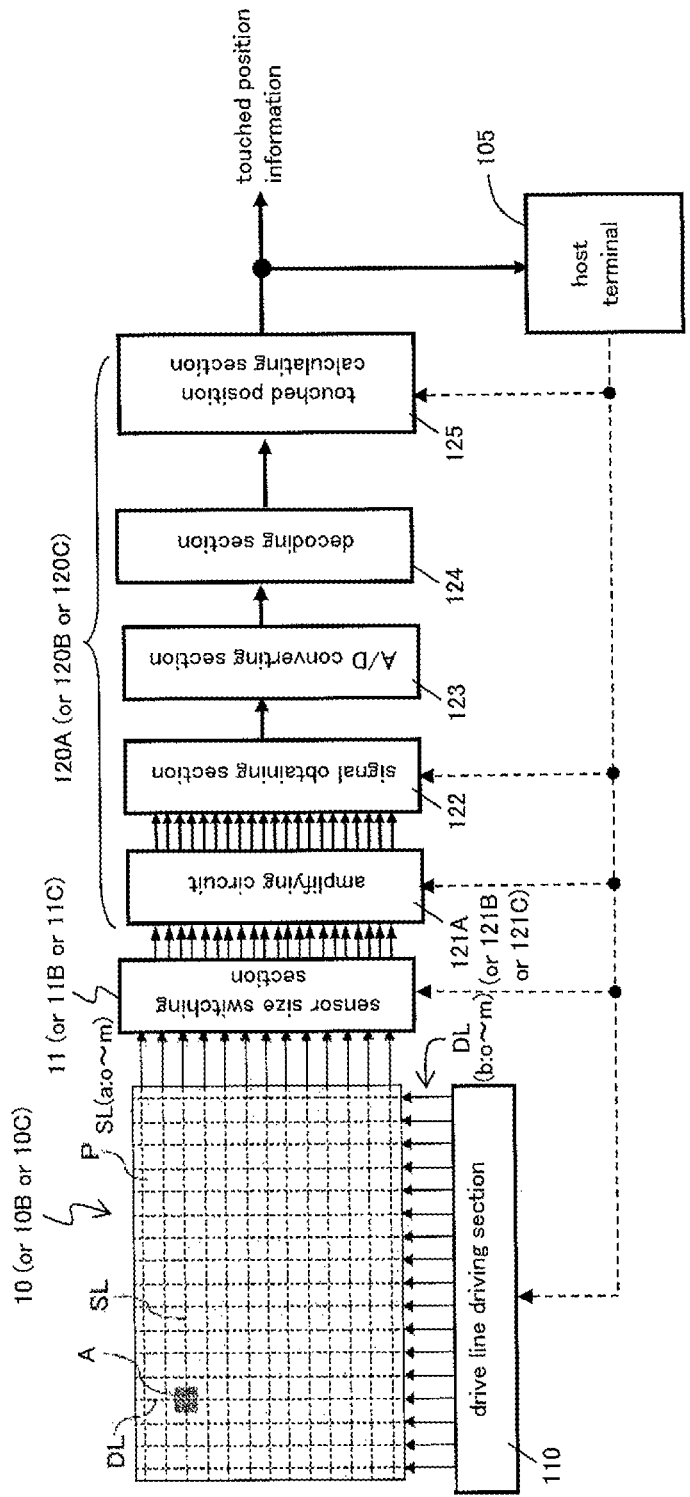
FIG. 1 is a structural drawing schematically showing a touch panel system in Embodiment 1 of the present invention.

REFERENCE NUMERAL LIST 1, 1B, 1C touch panel system
10, 10B, 10B1-10B5, 10C touch sensor panel (position inputting device)
11, 11B, 11C sensor size switching section
105 host terminal
110 drive line driving section
120A-120C touched position detecting section
121A-121C amplifying circuit
121a-121c operational amplifier
122 signal obtaining section
123 A/D converting section
124 decoding section
125 touched position calculating section
12, 13, 14 sense electrode pattern
12a, 13a, 14a sub-sense electrode pattern
90 electronic equipment
91 operation key
92 display section
92a display controlling section
92b display panel
93 speaker
94 microphone
95 camera
96 CPU (central processing unit)
97 RAM
98 ROM
P display screen
DL drive line
SL sense line
a, b, a, e, f sub-sense line
C1-C9 feedback capacitance
S4, S4'-S6, S6', S9, S9', S10, S10' switch
S1-S3, S7, S8 switch

DESCRIPTION OF EMBODIMENTS

Hereinafter, Embodiments 1-6 of a touch panel system using a touch sensor panel of the present invention and an electronic equipment using the same are explained in detail while referring to the Figures. In addition, from the standpoint of creating the Figures, the thickness, length, and the like of each constituent member in each Figure is not limited to the illustrated configuration.

(Embodiment 1)

Figure 21:
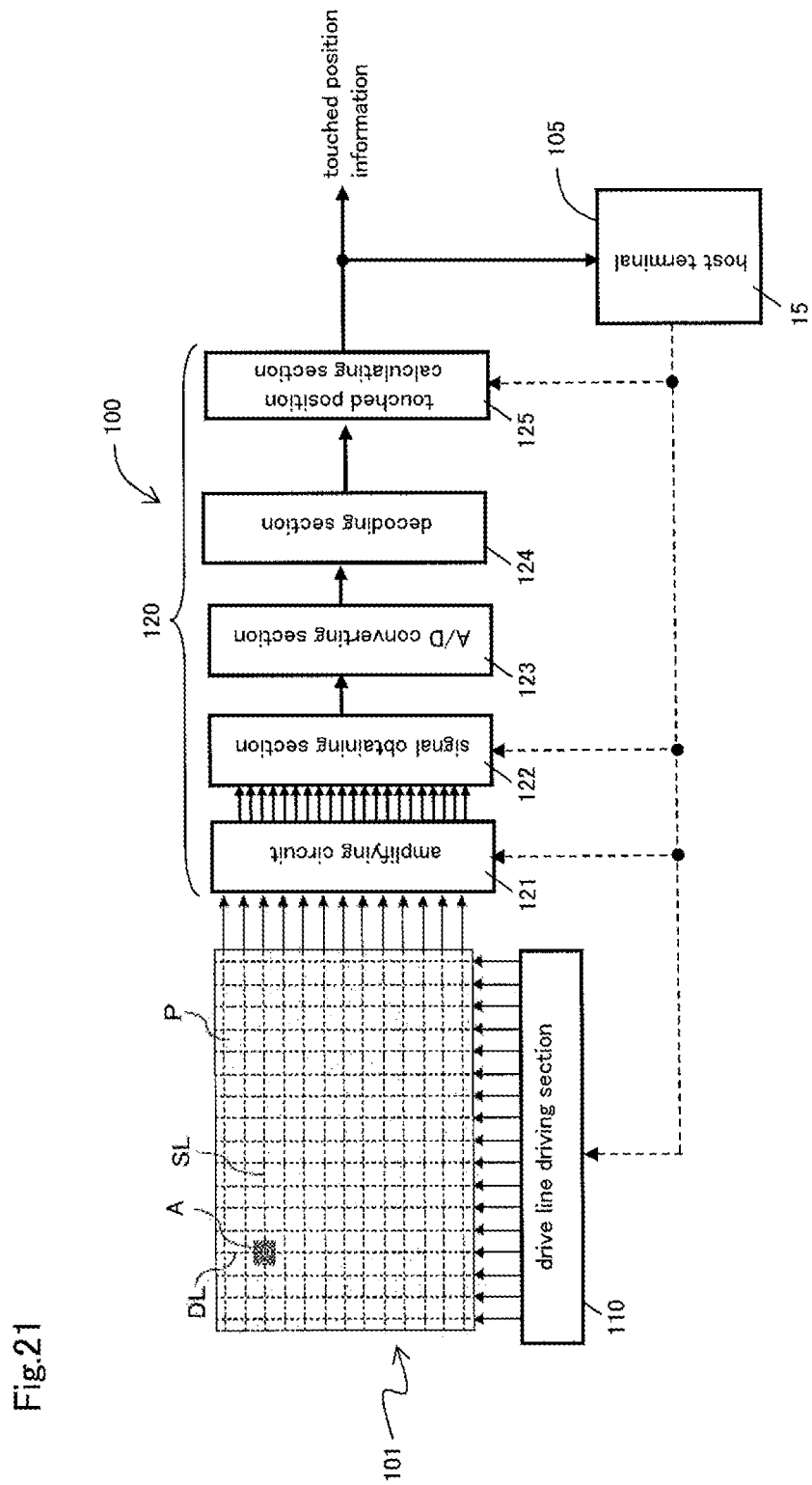
FIG. 21 is a structural drawing of a conventional display device with a position inputting device, having a conventional touch panel system installed as the position inputting device.
Figure 22:
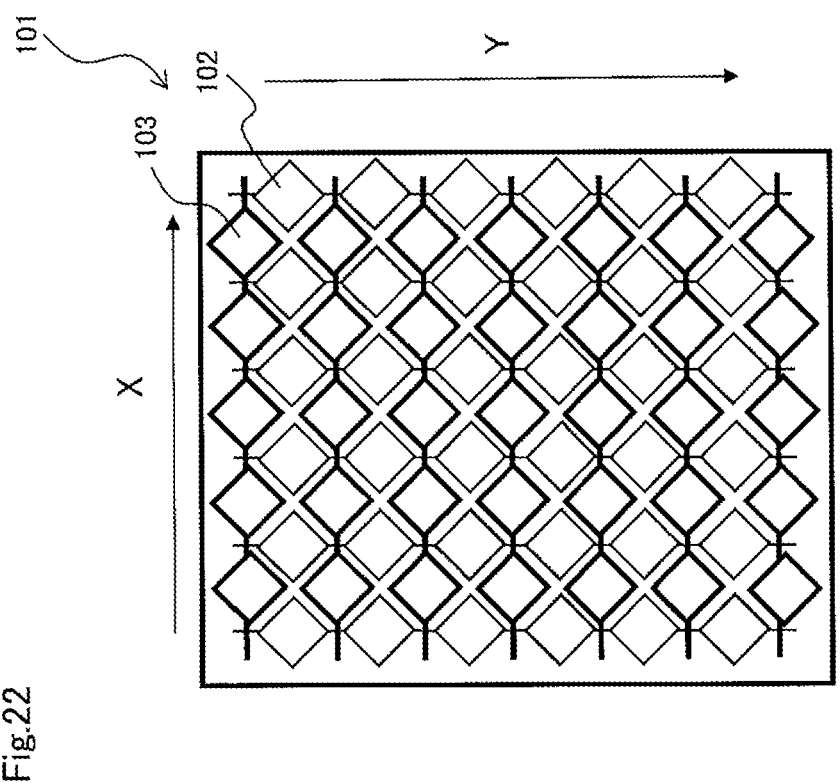
FIG. 22 is a partially enlarged plan view of a touch panel showing an example of a shape of electrodes of drive lines DL and sense lines SL of FIG. 21.

FIG. 1 is a structural drawing schematically showing a touch panel system in Embodiment 1 of the present invention. Constituent members achieving the same working effect as the conventional constituent members of FIG. 21 are explained while being assigned with the same reference numeral.

In FIG. 1, a touch panel system 1 of Embodiment 1 comprises: an electrostatic capacitive touch sensor panel 10, as a position inputting device, provided on a front surface of a display device; a sensor size switching section 11 for switching the electrode size of a sense electrode pattern of sense lines SL between at least two electrode sizes of large and small; a drive line driving section 110 for causing a state signal of electrostatic capacitance to be generated in the sense lines SL that intersect drive lines DL in a plane view by driving the drive lines DL provided on the touch sensor panel 10; a touched position detecting section 120A for detecting a touched position in contact with or in the proximity of a display screen P by processing the state signal of electrostatic capacitance generated by the sense lines SL; and a host terminal 105 for controlling the drive line driving section 110 and the touched position detecting section 120A.

The touch sensor panel 10 is provided with a plurality of parallel drive lines DL provided for each predetermined interval on the display screen P of a liquid crystal panel as a display device and a plurality of parallel sense lines SL which intersect in a plan view with the drive lines DL for each predetermined interval. In addition, each of the lines is provided with electrodes (sense electrode pattern) for detecting capacitance.

The display screen P of a liquid crystal panel is controlled by a host computer (not shown) to display a video or a still image and to display an instruction image corresponding to input position information for the touch sensor panel 10, as a position inputting device, provided on the top surface side of the display screen P.

A user can input information corresponding to a touched position of an instruction image if a region where the instruction image is displayed on the display screen P of a liquid crystal panel is contacted with a finger or the like. Further, the touch sensor panel 10, as a position inputting device, has a touch region for inputting position information by a touch operation. The coordinates of the touch region correspond one to one with the coordinates of the display screen P of a liquid crystal panel.

The sensor size switching section 11 is provided between the plurality of sense lines SL and the touch position detecting section 120A. The size of electrodes of a square (or rhombus) sense electrode pattern in a plan view is switched between at least two electrode sizes of large and small.

For the large electrode size, there is a square sense electrode pattern in two regions formed by four intersections of sense lines and drive lines adjacent to one another and four intersections of the same adjacent thereto. The large electrode size is 1/4 of a region within the two regions. Thus, the maximum electrode size is half the region size within the four intersections adjacent to one another. Specifically, the maximum electrode size of the large electrode size corresponds to half the size of the maximum electrode region within the four intersections adjacent to one another. The maximum electrode size is the electrode size of the conventional sense electrode pattern. With this as the baseline, power consumption is reduced by switching to an electrode size that is smaller.

Further, for the small electrode size, a sense electrode pattern is herein divided into four. Thus, the small electrode size is an electrode size that is 1/4 or more and 3/4 or less in terms of the large electrode size.

The sensor size switching section 11 has a size switching controlling section (not shown) for controlling to switch between at least two electrode sizes of large and small in accordance with the size of a pointer in contact with or in the proximity of the surface of the touch sensor panel 10. The size switching controlling section switches to a small electrode size for pointers in contact with or in the proximity of the surface of the touch sensor panel 10 with a larger size, and switches to a large electrode size for pointers in contact with or in the proximity of the surface thereof with a smaller size. Furthermore, the size switching controlling section that is not shown is configured to switch feedback capacitance of an amplifier, the amplifying circuit 121A, in response to the switching of the sensor size switching section 11.

The size of a pointer may be determined by detecting the actual size of a region with decreased electrostatic capacitance. However, the size is determined herein in accordance with whether a pointer is a fingertip or a touch pen. When a pointer is a fingertip, the size of a pointer is significantly larger than a touch pen. Thus, when a pointer is a fingertip, a sense electrode pattern can be switched to a divided small electrode size by the sensor size switching section 11 to reduce power consumption. Furthermore, if a pen with a large pointer range and a common pen with a small pointer range are used for the touch pen in addition to using a fingertip with a large pointer range, there would be three types of pointer sizes. Thus, an electrode size can be switched in three ways in accordance with the size of a pointer. It is also possible to distinguish a pen with a large pointer range and a common pen with a small pointer range in accordance with the position where a touch pen is connected. Moreover, it is possible to determine that a pointer is a fingertip when there is no connection of a touch pen to the main body of the panel.

The drive line driving section 110 sequentially drives the plurality of drive lines DL in a time sequence at a predetermined timing so that a state signal of electrostatic capacitance is generated in the plurality of sense lines SL.

The touched position detecting section 120A comprises: an amplifying circuit 121A for amplifying each state signal of electrostatic capacitance generated in the sense lines SL; a signal obtaining section 122 for obtaining the state signal of electrostatic capacitance amplified by each amplifying circuit 121A for outputting the signal in a time division while matching the timing of driving by the drive line driving section 110; an A/D converting section 123 for converting an analog signal output by the signal obtaining section 122 to a digital signal; a decoding section 124 for finding the amount of change in a capacitance distribution within the display screen P based on the digital signal converted by the A/D converting section 123; and a touched position calculating section 125 for calculating a touched position on the display screen P based on the amount of change in a capacitance distribution found by the decoding section 124 to generate touched position information indicating the touched position.

In summary, the difference between the touch panel system 1 of Embodiment 1 and the conventional touch panel system 100 of FIG. 21 is in having the sensor size switching section 11 for switching the electrode size of a sense electrode pattern between at least two electrode sizes of large and small and the amplifying circuit 121A for changing feedback capacitance of an amplifier in response to the switching. A sense electrode pattern divided into four is explained in detail by using FIG. 2, and the sensor size switching section 11 is explained in detail by using FIG. 3. In addition, the amplifying circuit 121A is explained in detail by using FIG. 4.

(Sense Electrode Pattern Divided into Four)

FIG. 2(a) is a partially enlarged plan view showing an example of a shape of electrodes of drive lines DL and sense lines SL in the touch panel 10 of FIG. 1. FIG. 2(b) is an enlarged view of a unit electrode shape of FIG. 2(a).

In FIGS. 2(a) and 2(b), a sense electrode pattern 12 of the plurality of sense lines SL that intersect the plurality of drive lines DL in a plan view is divided into 1/4 of a quadrangular shape, and a division of the sense electrode pattern 12 into 1/4 is shown by a two-dimensional capacitor array consisting of transparent electrodes.

Specifically, in the touch sensor panel 10, the sense lines SL are formed in a longitudinal direction and the drive lines DL are formed in the transverse direction. The sense electrode pattern 12 of the sense lines SL is equally divided into four single units of square shaped sub-sense electrode pattern 12a and is comprised of the four sub-sense electrode patterns 12a.

Furthermore, the sense line SL is comprised of three sub-sense lines a, b and c. The sub-sense electrode pattern 12a with 1/4 of the area of the sense electrode pattern 12 is connected to each of the sub-sense lines a and c. Further, two sub-sense electrode patterns 12a with 1/4 of the area are connected in series to the sub-sense line b. The sub-sense lines a, b and c are insulated from each other on the same layer.

In a case of the sense electrode pattern configuration dividing into 1/4s and in a touch operation by a user, or a pointer in contact with or in the proximity of the surface of the touch sensor panel 10 is large, it is contemplated that sensing processing is performed by activating, for example, one unit out of four units of the sensing sub-sense electrode patterns 12a with the sensor size switching section 11 for switching the sensor size when, for example, the sensing signal level is about 75% of the estimated maximum value, or by activating, for example, 2 units out of four units of the sensing sub-sense electrode patterns 12a by the sensor size switching section 11 for switching the sensor size when, for example, the sensing signal level is about 50% of the estimated maximum value. Thereby, a sensing range is made smaller so that the sensing signal level is lower and it is possible to configure associated devices such as the amplifying circuit 121A in a subsequent stage and to configure the power consumption to be smaller.

In this manner, when the sensing signal level is about 75% of the estimated maximum value, one out of four units of the sensing sub-sense electrode patterns 12a is activated, and when the sensing signal level is about 50% of the estimated maximum value, two out of four units of the sensing sub-sense electrode patterns 12a are activated. However, the present invention is not limited thereto. Furthermore, when the sensing signal level is less than about 25% of the estimated maximum value, or when there is no contact with the surface of the touch sensor panel 10 as discussed below, all four units of the sensing sub-sense electrode patterns 12a are activated. Furthermore, it is possible to include a case in which units are separated in another way so that three out of four units are activated.

Further, as another way of separation, as discussed in detail below, sensing processing may be performed by activating one out of four units of the sensing sub-sense electrode patterns 12a when the sensing signal level is 75% or more of the estimated maximum value, by activating two out of four units of the sensing sub-sense electrode patterns 12a when the sensing signal level is 50% or more and less than 75% of the estimated maximum value, and by activating four out of four units of the sensing sub-sense electrode patterns 12a when the sensing signal level is less than 50% of the estimated maximum value.

Since an object in contact with or in the proximity of the surface of the touch sensor panel 10 is large herein, there is no issue in identifying a position of touch operation even if sensing range is reduced. Thus, detection precision is not affected.

Further, when there is no contact with the surface of the touch sensor panel 10, the sensor size switching section 11 switches to a larger sensor size to expand an electrode region of the sensing sub-sense electrode patterns 12a to the maximum region of all four units. The maximum region of four units of sub-sense electrode pattern 12a is used to enable detection of a signal of a minor amount of electrostatic capacitance in two axial directions away from the touch sensor panel 10. Thereby, an object in two axial directions is readily detected.

(Switching of Electrode Size by Sensor Size Switching Section 11)

Figure 3:
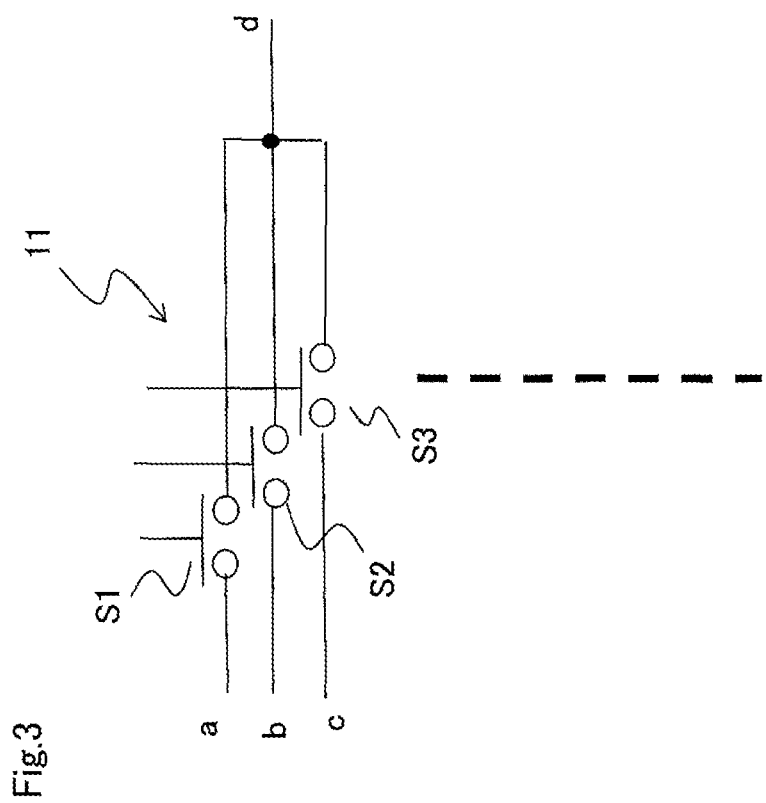
FIG. 3 is a circuit diagram showing an example configuration of a unit circuit section of a sensor size switching section of FIG. 1.

FIG. 3 is a circuit diagram showing an example configuration of a unit circuit section of the sensor size switching section of FIG. 1.

Figure 2:
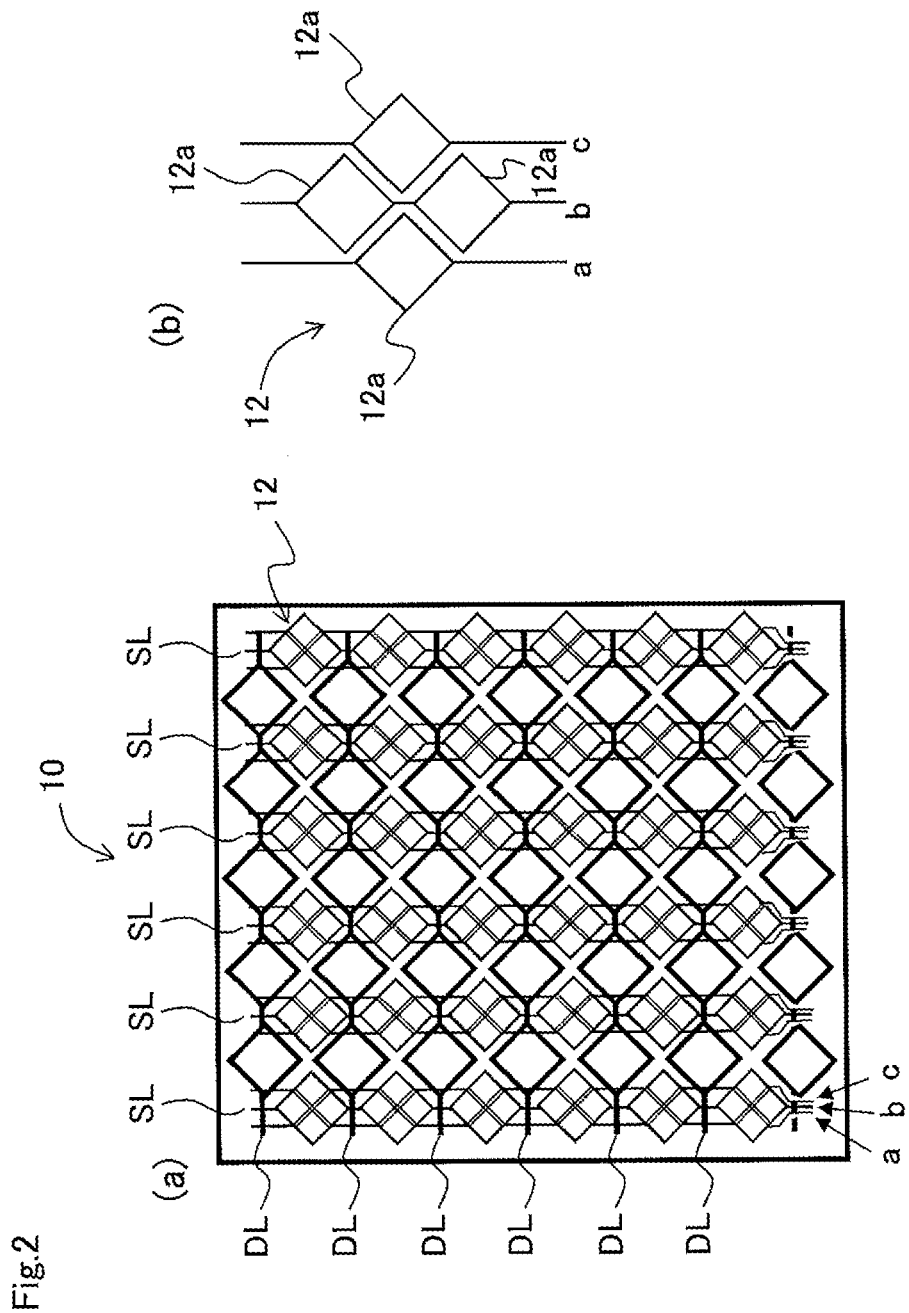
FIG. 2(a) is a partial plan view showing an example of a shape of electrodes of drive lines DL and sense lines SL in the touch panel of FIG. 1.
FIG. 2(b) is an enlarged view of a unit electrode shape of FIG. 2(a).

FIG. 3 shows a configuration of the sensor size switching section 11 corresponding to a group of a sense line SL (three sub-sense lines a, b, and c of FIG. 2). The same number of unit circuit sections of the sensor size switching section 11 as the number of the plurality of sense lines SL is provided.

In the unit circuit section of the sensor size switching section 11, switch S1-S3 are each provided on the three sub-sense lines a, b and c and are connected to at least one of the three sub-sense lines a, b and c. For example, when the sensor size switching section 11 turns on only the switch S1 (or switch S3) to select only the sub-sense line a (or sub-sense line c), one unit of the sub-sense electrode pattern 12a is selected so that an area of a sense electrode pattern would be 1/4. Further, when the sensor size switching section 11 turns on only the switch S2 (or switches S1 and S3) to select only the sub-sense line b (or sub-sense lines a and c), two units of the two sub-sense electrode patterns 12a in series are selected so that the area of the sense electrode pattern would be 1/2. Furthermore, when the sensor size switching section 11 turns on all of the switches S1-S3 to select the sub-sense lines a-c, four units of the sub-sense electrode patterns 12a are selected so that the area of the sense electrode patterns would be 4/4. Furthermore, although not selected herein, it is also possible to include a case of turning on the switches S1 and S2 (or S2 and S3) to activate three out of four units.

(Switching of Feedback Capacitance of Amplifying Circuit 121A)

Figure 4:
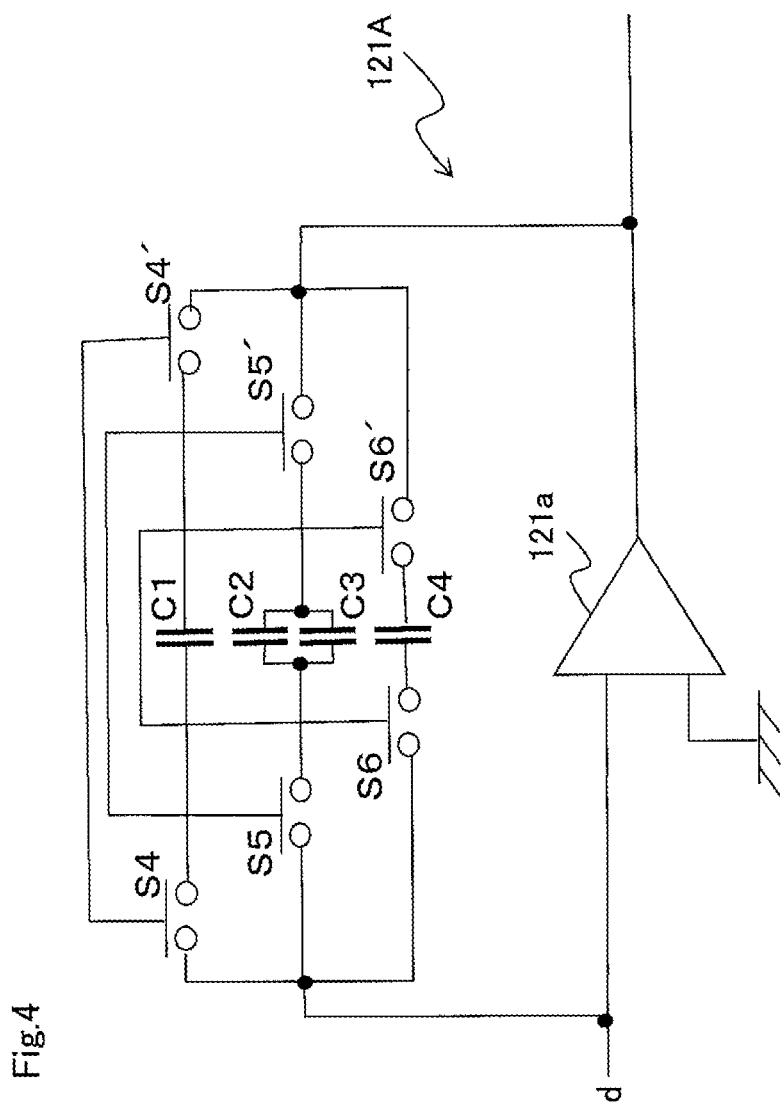
FIG. 4 is a circuit diagram showing a first example configuration of an amplifying circuit of FIG. 1.

FIG. 4 is a circuit diagram showing a first example configuration of the amplifying circuit 121A of FIG. 1.

In FIG. 4, it is possible to provide one amplifier for the plurality of sense lines SL and select the plurality of sense lines SL in a time sequence by a plurality of switching means for amplification in a time division. However, the amplifying circuit 121A is a plurality of single input amplifiers provided for each of the plurality of sense lines SL.

In the amplifying circuit 121A, an operational amplifier 121a is connected to a common switch terminal d of a unit circuit section of the sensor size switching section 11. The operational amplifier 121a is a type of operational amplifier capable of changing feedback capacitance. Feedback capacitance C1, C2, C3 and C4 for the operational amplifier 121a has the same size capacitance, which is connected to the operational amplifier 121a as feedback capacitance by turning on or off a pair of switches S4 and S4', S5 and S5' or S6 and S6'. The switches S4 and S4' turn on or off in concert as a pair, the switches S5 and S5' turn on or off in concert as a pair and the switches S6 and S6' turn on or off in concert as a pair. At least one of the capacitance C1, the capacitances C2+C3 and the capacitance C4 is connected thereby to the operational amplifier 121a as feedback capacitance of the operational amplifier 121a.

Control terminals of the switches S1-S3 of a unit circuit section of the sensor size switching section 11 of FIG. 3 and the pairs of switches S4 and S4' to S6 and S6' of the amplifying circuit 121A of FIG. 4 are controlled to turn on or off by a control signal from the host terminal 105.

The control terminals of the switches S1-S3 of a unit circuit section of the sensor size switching section 11 of FIG. 3 and the pairs of switches S4 and S4' to S6 and S6' of the amplifying circuit 121A of FIG. 4 are controlled to turn on or off by a size switching controlling section (not shown) of the sensor size switching section 11. The size switching controlling section (not shown) may be provided within the host terminal 105. In addition, the switches S1 and S2 of FIG. 3 and the switches S4 and S4' to S6 and S6' of FIG. 4 may be controlled to turn on or off by a control signal from the size switching controlling section (not shown) in the host terminal 105.

When the sensor size is to be 1/4, the above-described control operation turns on only the switch S1 of a unit circuit section of the sensor size switching section 11 and turns on only the switches S4 and S4' of the operational amplifier 121a to connect only the feedback capacitance C1 to both ends of the operational amplifier 121a.

When the sensor size is to be 2/4, only the switch S2 of a unit circuit section of the sensor size switching section 11 is turned on and only the switches S5 and S5' of the operational amplifier 121a are turned on to connect the feedback capacitances C2 and C3 to both ends of the operational amplifier 121a.

When the sensor size is to be 3/4, the switches S1 and S2 of a unit circuit section of the sensor size switching section 11 are turned on and the switches S4 and S4' and the switches S5 and S5' of the operational amplifier 121a are turned on to connect the feedback capacitance C1 and the feedback capacitances C2 and C3 to both ends of the operational amplifier 121a.

When the sensor size is to be 4/4, in other words when all electrodes are used, all of the switches S1 to S3 of a unit circuit section of the sensor size switching section 11 are turned on and all of the switches S4 and S4' to S6 and S6' of the operational amplifier 121a are turned on to connect the feedback capacitance C1, the feedback capacitances C2 and C3 and the feedback capacitance C4 to both ends of the operational amplifier 121a.

By the above-described switching, feedback capacitance can be 1/4 when the sensor size is 1/4, feedback capacitance can be 2/4 when the sensor size is 2/4, feedback capacitance can be 3/4 when the sensor size is 3/4 and feedback capacitance can be 4/4 when the sensor size is 4/4 to obtain feedback capacitance of the operational amplifier 121a in a size corresponding to the sensor size. For this reason, load capacitance of the operational amplifier 121a can be smaller when the sensor size is small. Thus, power consumption can be drastically reduced.

Figure 5:
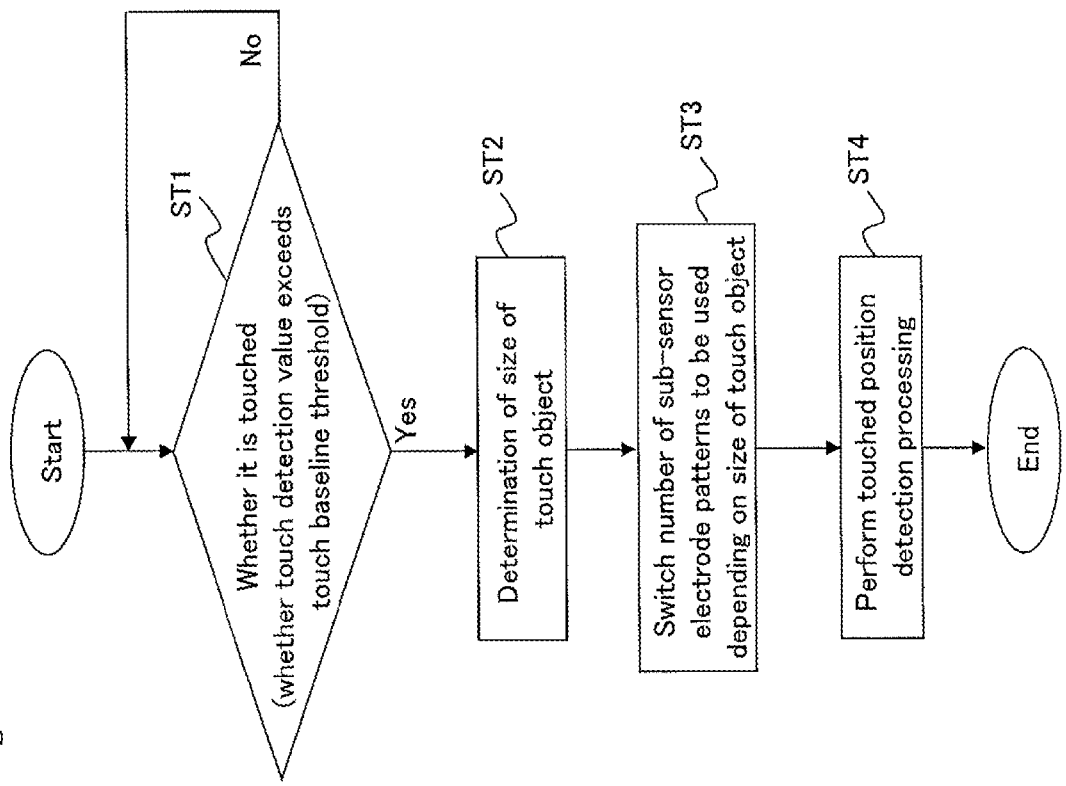
FIG. 5 is a flow chart for explaining the operation of the touch panel system of Embodiment 1 in FIG. 1.

With the configuration described above, the operation of the touch panel system 1 of Embodiment 1 is explained by using the flow chart of FIG. 5.

FIG. 5 is a flow chart for explaining the operation of the touch panel system of Embodiment 1 in FIG. 1.

As shown in FIG. 5, first, it is detected whether a touch operation has been performed on the touch sensor panel 10 in step ST1. Specifically, it is determined whether a touch detection value exceeds a touch baseline threshold in step ST1. In step ST1, the system waits until the touch detection value exceeds the touch baseline threshold. When it is determined that the touch detection value exceeds the touch baseline threshold and that a touch operation has been performed (YES in step ST1), the operation transitions to the processing of the next step ST2.

Next, the size of a pointer is determined in step ST2. It is determined whether the pointer is a fingertip or a touch pen. It is possible to determine that the pointer is a touch pen when the touch pen is connected to the main body of the panel or the pointer is a fingertip when the touch pen is not connected to the main body of the panel.

Subsequently, the number of sub-sense electrode patterns 12a to be used is switched in accordance with the size of the pointer in step ST3.

As stated above, when an object in contact with or in the proximity of the touch sensor panel 10 is large, sensing processing is performed by activating, for example, one out of four units of the sensing sub-sense electrode pattern 12a with the sensor size switching section 11 for switching the sensor size when, for example, the sensing signal level is over 75% of the estimated maximum value, or by activating, for example, two out of four units of the sensing sub-sense electrode pattern 12a with the sensor size switching section 11 for switching the sensor size when, for example, the sensing signal level is over 50% but under 75% of the estimated maximum value, or by activating, for example, four out of four units of the sensing sub-sense electrode patterns 12a with the sensor size switching section 11 for the switching sensor size when, for example, the sensing signal level is under 50% of the estimated maximum value. Touched position detection processing of step ST4 is then performed.

According to Embodiment 1 from the above, in the touch sensor panel 10 for inputting a position by a touch operation to a predetermined region, the plurality of drive lines DL disposed in one direction and the plurality of sense lines SL disposed in another direction intersect each other, and the electrode size of an electrode of a sense pattern in one direction (sense electrode pattern) disposed between adjacent intersections is switched between at least two electrode sizes of large and small.

Thereby, since the large electrode size is the conventional electrode size, power consumption can be further reduced due to a small electrode size without affecting detection precision, even when switched to the small electrode size when a pointer, such as a fingertip, is large. In this case, detection precision of a touched position can be maintained because sampling scan is not performed as in the conventional technique.

(Embodiment 2)

The above-described Embodiment 1 explains a case in which the shape of an electrode of a sense electrode pattern, as an example of a shape of an electrode, is a quadrangle (square) and the sense electrode pattern is divided into four so that the switchable electrode size is 1/4 thereof. However, Embodiment 2 explains a case where the shape of an electrode of a sense electrode pattern, as an example of the shape of an electrode, is a triangle and the sense electrode pattern is divided into two so that the switchable electrode size is 1/2 thereof.

In FIG. 1, a sensor size switching section 11B is provided between a plurality of sense lines SL and a touched position detecting section 120B, and electrode size of a square (or rhombus) sense electrode pattern in a plan view is switched between two electrode sizes of large and small.

The large electrode size corresponds to half the region size within four intersections of sense lines and drive lines adjacent to one another. The large electrode size is the electrode size of a conventional sense electrode pattern. With this as the baseline, power consumption is reduced by switching to an electrode size that is smaller.

Further, the sense electrode pattern is herein divided into two for the small electrode size. Thus, the small electrode size is 1/2 the electrode size of the large electrode size.

The sensor size switching section 11B has a size switching controlling section (not shown) for controlling switching between two electrode sizes of large and small in accordance with the size of a pointer in contact with or in the proximity of the surface of the touch sensor panel 10B. The size switching controlling section switches to a small electrode size for pointers in contact with or in the proximity of the surface of the touch sensor panel 10B with a larger size, and switches to a large electrode size for pointers in contact with or in the proximity of the surface with a smaller size. Furthermore, the size switching controlling section that is not shown is configured to switch feedback capacitance of an amplifier, the amplifying circuit 121B, in response to switching of the sensor size switching section 11B.

The size of a pointer may be determined by detecting the actual size of a region with decreased electrostatic capacitance. However, it is determined herein in accordance with whether a pointer is a fingertip or a touch pen. When a pointer is a fingertip, the size of the pointer is significantly larger than a touch pen. Thus, when the pointer is a fingertip, a sense electrode pattern can be switched to a small electrode size, divided into two by the sensor size switching section, 11B to reduce power consumption.

FIG. 6(a) is a partial plan view showing an example of a shape of an electrode of drive lines DL and sense lines SL in the touch panel 10B of in Embodiment 2 of the present invention. FIG. 6(b) is an enlarged view of a unit electrode shape of FIG. 6(a). Constituent members achieving the same working effect as the conventional constituent members of FIG. 1 are explained while being assigned with the same reference numeral. Touch panels 10B1-10B5 are each variants of the touch panel 10B described below in FIGS. 9-16 of Embodiments 3 and 4.

In FIGS. 6(a) and 6(b), a sense electrode pattern of the plurality of sense lines SL is divided into a triangular shape with 1/2 the electrode size in the touch panel 10B, and a division of the sense electrode pattern into two is shown by a two-dimensional capacitor array consisting of transparent electrodes.

Specifically, in the touch sensor panel 10B, the sense lines SL are formed in a longitudinal direction and the drive lines DL are formed in the transverse direction. A unit of the square shaped sense electrode pattern of the sense lines SL is equally divided into two in the longitudinal direction and is comprised of two sub-sense electrode patterns 13a in the left and right. A sense line is comprised of two units of triangular sub-sense lines. This is used differently in that since the electrode size is divided into two in FIG. 6, the configuration can be used when the size of a pointer for a touch operation is even smaller in comparison to a case of dividing the electrode size into four in FIG. 1.

The difference between the touch panel system 1B of Embodiment 2 and the conventional touch panel system 100 of FIG. 21 is in having the sensor size switching section 11B for switching the electrode size of a sense electrode pattern between two electrode sizes of large and small and the amplifying circuit 121B for changing feedback capacitance of an amplifier in response to the switching. The sensor size switching section 11B is explained in detail by using FIG. 7, and the amplifier circuit 121B is explained in detail by using FIG. 8.

(Switching of Electrode Size by Sensor Size Switching Section 11B)

Figure 6:
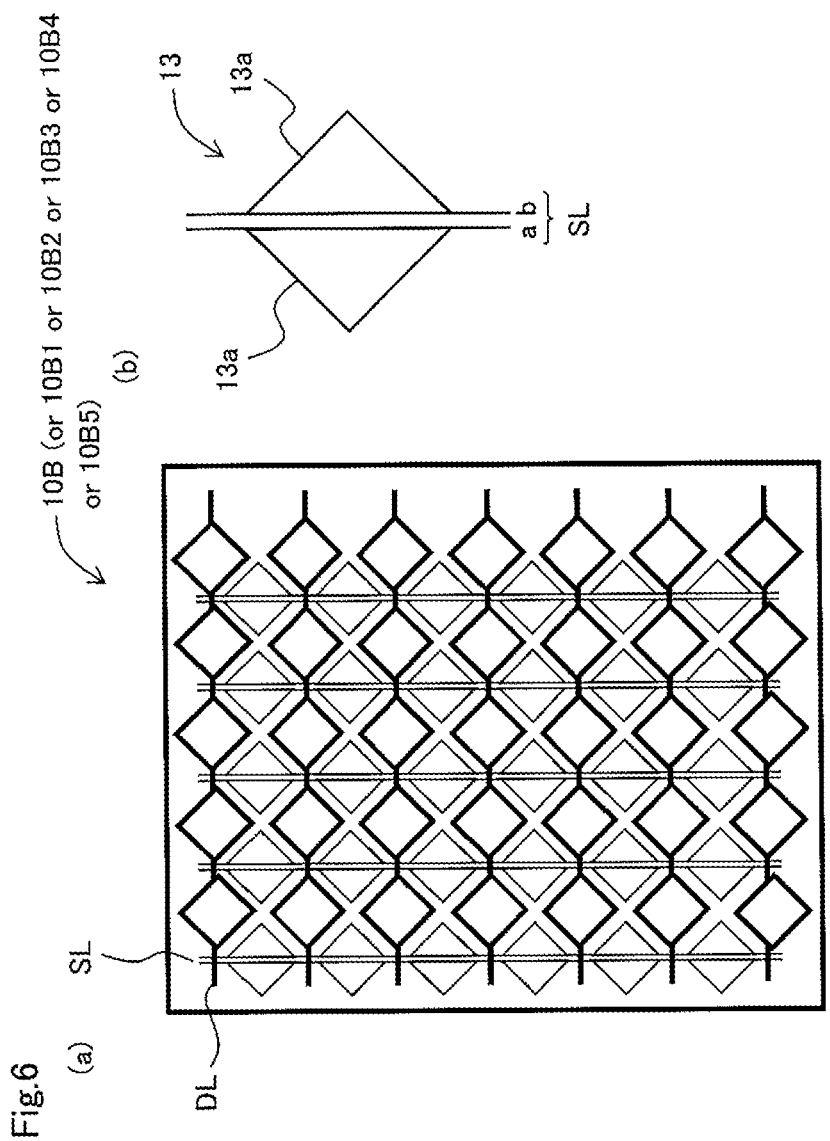
FIG. 6(a) is a partial plan view showing an example of a shape of electrodes of drive lines DL and sense lines SL in a touch panel of Embodiment 2 of the present invention.
FIG. 6(b) is an enlarged view of a unit electrode shape of FIG. 6(a).
Figure 7:
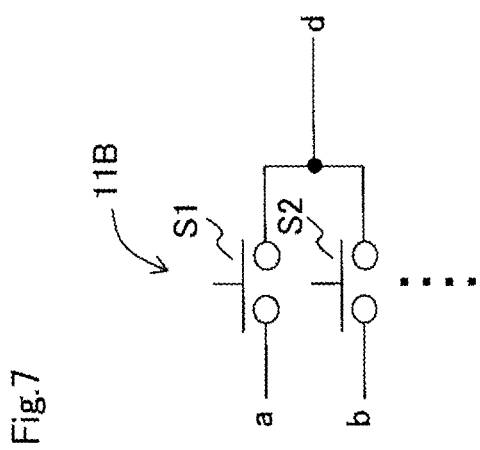
FIG. 7 is a circuit diagram showing an example configuration a sensor size switching section of FIG. 6.

FIG. 7 is a circuit diagram showing an example configuration of the sensor size switching section of FIG. 6.

FIG. 7 shows a configuration of the sensor size switching section 11B corresponding to a group of a sense line SL (two sub-sense lines a and b of FIG. 6). The same number of unit circuit sections of the sensor size switching section 11B as the number of the plurality of sense lines SL is provided.

In the unit circuit section of the sensor size switching section 11, switch S1 and S2 are each provided on the two sub-sense lines a and b, and are connected to at least one of the two sub-sense lines a and b. For example, when the sensor size switching section 11B turns on only the switch S1 to select only the sub-sense line a, one unit of the sub-sense electrode pattern 13a is selected so that an area of a sense electrode pattern would be reduced to 1/2. Further, when the sensor size switching section 11B turns on both the switchs S1 and S2 to select the sub-sense lines a and b, two units (both) of the two sub-sense electrode patterns 13a are selected so that the area of the sense electrode pattern would be 2/2.

(Switching of Feedback Capacitance of Amplifying Circuit 121B)

Figure 8:
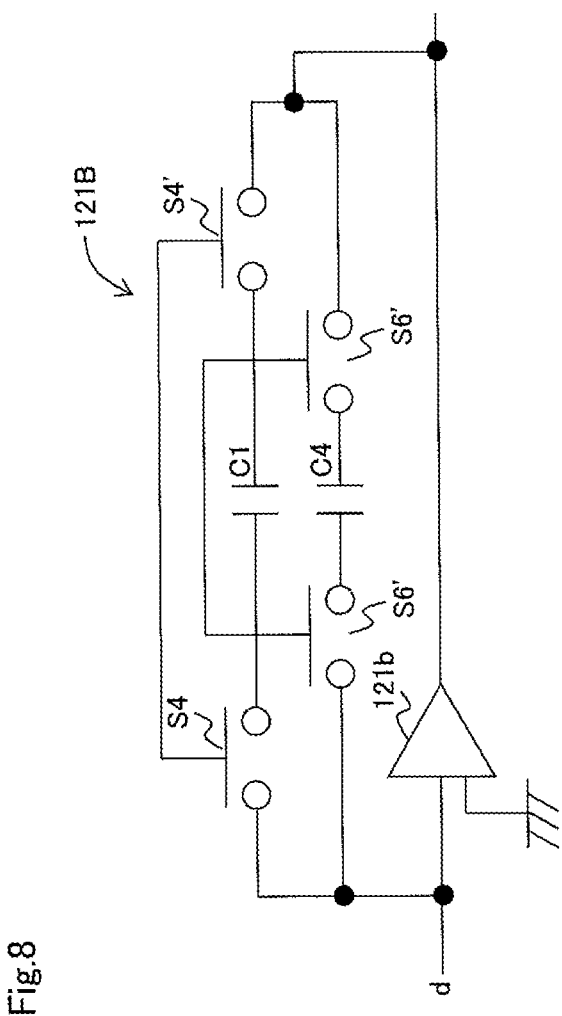
FIG. 8 is a circuit diagram showing a second example configuration of the amplifying circuit of FIG. 1.

FIG. 8 is a circuit diagram showing a second example configuration of the amplifying circuit 121B of FIG. 1.

In FIG. 8, it is possible to provide one amplifier for the plurality of sense lines SL and select the plurality of sense lines SL in a time sequence by a plurality of switching means for amplification in a time division. However, the amplifying circuit 121B is herein a plurality of single input amplifiers (may also be a differential amplifier) provided for each of the plurality of sense lines SL.

In the amplifying circuit 121B, an operational amplifier 121b is connected to a common switch terminal d of a unit circuit section of the sensor size switching section 11B. The operational amplifier 121b is a type of operational amplifier capable of changing feedback capacitance. Feedback capacitance C1 and C4 for the operational amplifier 121b has the same size capacitance, which is connected to the operational amplifier 121b as feedback capacitance by a pair of switches S4 and S4' and/or S6 and S6'. The switches S4 and S4' turn on or off in concert as a pair and the switches S6 and S6' turn on or off in concert as a pair. At least one of the capacitance C1 and capacitance C4 is connected thereby to the operational amplifier 121b as feedback capacitance of the operational amplifier 121b.

Each control terminal of the switches S1 and S2 of FIG. 7 and the switches S4 and S4' as well as S6 and S6' of FIG. 8 is controlled to turn on or off by a size switching controlling section (not shown) of the sensor size switching section 11B. The size switching controlling section (not shown) may be provided within a host terminal 105. In addition, the switches S1 and S2 of FIG. 7 and the switches S4 and S4' as well as S6 and S6' of FIG. 8 may be controlled to turn on or off by a control signal from the size switching controlling section (not shown) in the host terminal 105.

When the sensor size is to be 1/2, the above-described control operation turns on only the switch S1 and turns on only the switches S4 and S4' of the operational amplifier 121b to connect the capacitance C1 as feedback capacitance to both ends of the operational amplifier 121b.

When the sensor size is to be 2/2, in other words when all electrodes are used, both of the switches S1 and S2 are turned on and all of the switches S4 and S4' and S6 and S6' of the operational amplifier 121b are turned on to connect the capacitance C1 and capacitance C4, as feedback capacitance, to both ends of the operational amplifier 121b.

By the above-described switching, feedback capacitance can be 1/2 when the sensor size is 1/2 and feedback capacitance can be 2/2 when the sensor size is 2/2 to obtain feedback capacitance of the operational amplifier 121b in a size corresponding to the sensor size. For this reason, load capacitance of the operational amplifier 121b can be smaller when the sensor size is small. Thus, power consumption can be reduced.

With the configuration described above, the operation of the touch panel system 1B of Embodiment 2 is explained in detail by using the flow chart of FIG. 5, similarly to the case of the touch panel system 1 of Embodiment 1 described above.

As shown in FIG. 5, first, it is detected whether a touch operation has been performed on the touch sensor panel 10B in step ST1. Specifically, it is determined whether a touch detection value exceeds a touch baseline threshold in step ST1. In step ST1, the system waits until the touch detection value exceeds the touch baseline threshold. When it is determined that the touch detection value exceeds the touch baseline threshold and that a touch operation has been performed (YES in step ST1), the operation transitions to the processing of the next step ST2.

Next, the size of a pointer is determined in step ST2. It is determined whether the pointer is a fingertip or a touch pen. It is possible to determine that the pointer is a touch pen when the touch pen is connected to the main body of the panel or that the pointer is a fingertip when the touch pen is not connected to the main body of the panel.

Subsequently, the number of divided electrodes of a sub-sense electrode pattern to be used is switched in accordance with the size of the pointer in step ST3.

As stated above, when a pointer in contact with or in the proximity of the touch sensor panel 10B is large, sensing processing is performed by activating, for example, one out of two units of the sensing sub-sense electrode pattern 13a with the sensor size switching section 11B for switching the sensor size when, for example, the sensing signal level is over 75% of the estimated maximum value. Further when a pointer in contact with or in the proximity of the touch sensor panel 10B is small, sensing processing is performed by activating, for example, two out of two units of the sensing sub-sense electrode patterns 13a with the sensor size switching section 11B for the switching sensor size when, for example, the sensing signal level is under 75% of the estimated maximum value. Touched position detection processing of step ST4 is then performed.

Alternatively, when a pointer in contact with or in the proximity of the touch sensor panel 10B is large, for example when the sensing signal level is over 50% of the estimated maximum value, sensing processing is performed by activating, for example, one out of two units of the sensing sub-sense electrode patterns 13a with the sensor size switching section 11B for switching the sensor size. Further, when a pointer in contact with or in the proximity of the touch sensor panel 10B is small, for example when the sensing signal level is under 50% of the estimated maximum value, sensing processing is performed by activating, for example, two out of two units of the sensing sub-sense electrode patterns 13a with the sensor size switching section 11B for the switching sensor size. Touched position detection processing of step ST4 is then performed.

In other words, one out of two units of the sensing sub-sense electrode patterns 13a may be activated when the sensing signal level is 75% or more of the estimated maximum value while two out of two units of the sensing sub-sense electrode patterns 13a may be activated when the sensing signal level is less than 75% of the estimated maximum value. Alternatively, one out of two units of the sensing sub-sense electrode patterns 13a may be activated when the sensing signal level is 50% or more of the estimated maximum value while two out of two units of the sensing sub-sense electrode patterns 13a may be activated when the sensing signal level is less than 50% of the estimated maximum value According to Embodiment 2 from the above, in the touch sensor panel 10B for inputting a position by a touch operation to a predetermined region, the plurality of drive lines DL disposed in one direction and the plurality of sense lines SL disposed in another direction intersect each other and the electrode size of an electrode of a sense pattern in one direction (sense electrode pattern) disposed between adjacent intersections is switched between two electrode sizes of large and small.

Thereby, since the large electrode size is the conventional electrode size, power consumption can be further reduced due to a small electrode size without affecting detection precision, even when switched to the small electrode size when a pointer, such as a fingertip, is large. In this case, detection precision of a touched position can be maintained because sampling scan is not performed as in the conventional technique.

(Embodiment 3 )

The above-described Embodiment 2 explains a case in which the shape of an electrode of a sense electrode pattern is triangular, as an example of a shape of an electrode, and the sense electrode pattern is divided into two so that the size of a switchable electrode is 1/2. However, Embodiment 3 explains a case of having a touch mode and a hover mode in addition to the configuration of Embodiment 2 described above and simultaneously using a plurality of divided sub-sense lines exceeding the electrode size prior to division without any space between the lines with excellent detection sensitivity in the hover mode.

Figure 9:
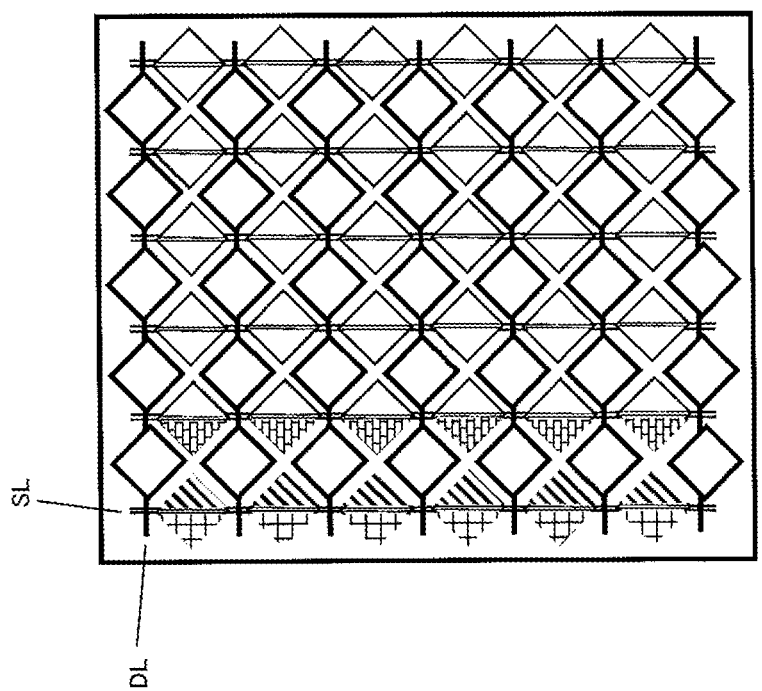
FIG. 9 is a partial plan view showing an example of a shape of electrodes and an example of electrode selection of drive lines DL and sense lines SL in a touch panel 10B1 of Embodiment 3 of the present invention.

FIG. 9 is a partial plan view showing an example of a shape of an electrode and an example of electrode selection of drive lines DL and sense lines St in a touch panel 10B1 of Embodiment 3 of the present invention. FIG. 9 is a case in which the shape of an electrode is the same triangular shape in a plan view divided into two as the shape of the electrode in FIG. 6(*a*) and FIG. 6(*b*), but three consecutive 1/2 size lines are provided as a set without any space between the lines when a plurality of divided sub-sense lines are used simultaneously. Herein, only a set of three consecutive 1/2 lines of sense electrode patterns is shown by a mesh, diagonal line, and brick patterns as an example of electrode selection.

For an example of electrode connection having a touch mode and a hover mode and using a plurality of divided sub-sense lines simultaneously without space between the lines in the hover mode for a proximate position input operation, in FIG. 9 a mode is switched from the touch mode to the hover mode in a case of the above-described Embodiment 2 where a sense electrode pattern is divided into two and is switchable, and a plurality of divided sense lines SL are used simultaneously as a set of three consecutive 1/2 lines (mesh, diagonal line, and brick patterns) for each predetermined number of lines with a switching means.

In Embodiment 3, in the touch mode for a case of detecting a touched position when a pointer such as a finger or a touch pen contacts a touch panel 10B1 and in the hover mode for a case of detecting a position of a pointer in the proximity of the touch panel 10B1 without contact, a mode can be switched from the touch mode to the hover mode or from the hover mode to the touch mode for processing. In other words, the processing described in Embodiment 2 described above is performed in the touch mode and the following processing is performed in the hover mode.

An electrode size of a sense electrode pattern of the sense lines SL is divided into two on the left and right in a triangular shape with 1/2 the electrode size, and a sense electrode pattern is divided into two triangular shapes in a two dimensional capacitor array consisting of transparent electrodes. FIG. 9 shows a set of simultaneously used electrodes in the hover mode according to Embodiment 3 as a set with mesh, diagonal line, and brick patterns. In other words, in the hover mode, three lines (a, b, a) of the sense lines SL consisting of a sense electrode pattern with 1/2 the electrode size shown by mesh, a sense electrode pattern with 1/2 the electrode size shown by diagonal lines, and a sense electrode pattern with 1/2 the electrode size shown with a brick pattern are connected by a switching means to enable use of a sensing operation simultaneously. The next three lines (b, a, b) are further disposed adjacent to the three lines (a, b, a) on the right side. Furthermore, the next three lines (a, b, a) are further disposed adjacent to the three lines (b, a, b) on the right side.

In this manner, a sense electrode pattern of adjacent three lines of sense lines SL are connected and used simultaneously as a set that exceeds the size prior to division can be applied to a so-called hovering operation in a case of detecting a position of a proximate operation by approaching the touch panel 10B1 without contact in addition to cases requiring more sensitivity.

Meanwhile, the above-described Embodiment 2 explains a case of using both or one of the sense electrode patterns with 1/2 the electrode size for an electrode consisting of the sense electrode pattern with 1/2 the electrode size shown by mesh and the sense electrode pattern with 1/2 the electrode size shown by diagonal lines as shown in, for example, FIG. 9. However, Embodiment 3 can enhance sensitivity by simultaneously using each adjacent three lines of the sense lines SL consisting of a sense electrode pattern with 1/2 the electrode size shown by mesh, a sense electrode pattern with 1/2 the electrode size shown by diagonal lines, and a sense electrode pattern with 1/2 the electrode size shown with a brick pattern sequentially by increasing the number of lines so that the size exceeds that prior to the division.

With the configuration described above, the operation is explained by using FIG. 10

Figure 10:
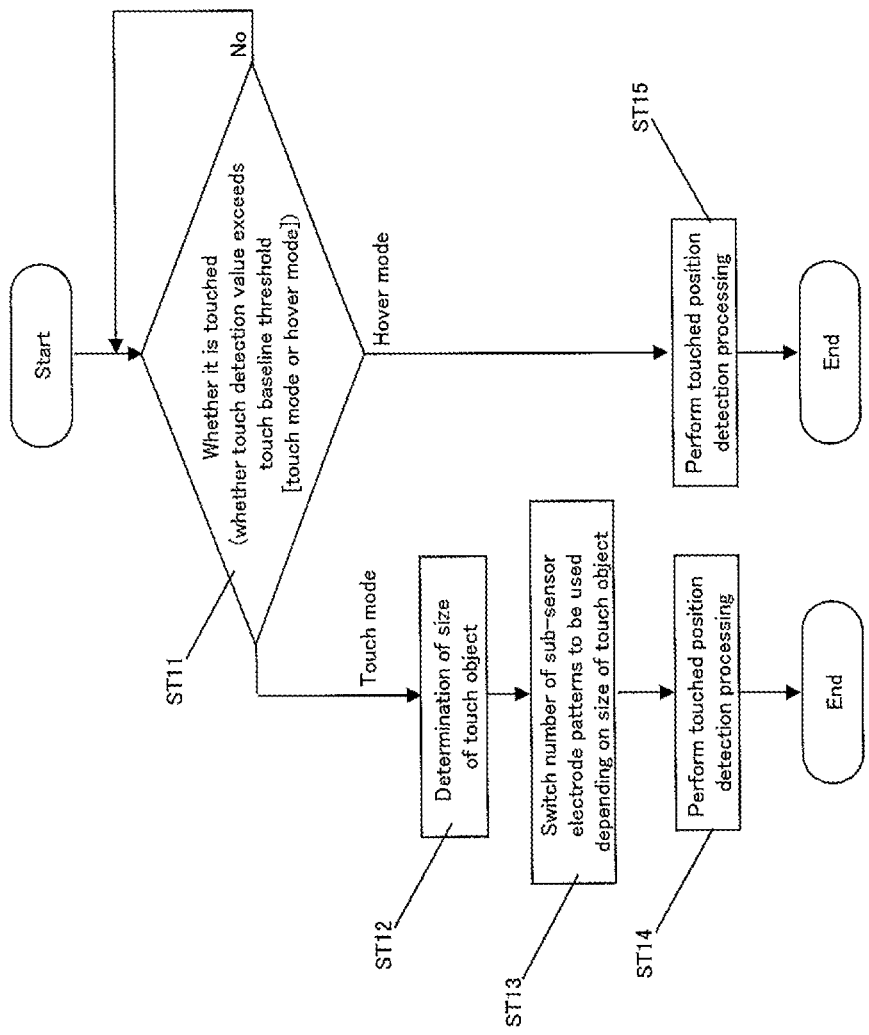
FIG. 10 is a flow chart for explaining the operation of a touch panel system of Embodiment 3 of FIG. 9.

FIG. 10 is a flow chart for explaining the operation of the touch panel system 1B of Embodiment 3 of FIG. 1.

As shown in FIG. 10, first, it is detected whether a touch operation or a proximity operation has been performed by a pointer (finger or touch pen) on the touch sensor panel 10B1 in step ST11. Specifically, it is determined whether a touch detection value or a proximity detection value exceeds a touch baseline threshold or proximity baseline threshold value in step ST11. Further, when it is determined in step ST11 that the touch detection value or proximity detection value exceeds the touch baseline threshold or proximity baseline value so that a touch operation or a proximity operation is performed, the operation transitions to the next step ST12 in a case of a touch operation and to processing of the next step ST15 in a case of a proximity operation.

In summary, for a baseline threshold value, Embodiment 3 has two threshold values, the touch baseline threshold value in the touch mode and the proximity baseline threshold value in the hover mode. When the touch baseline threshold value in the touch mode is exceeded, the touch mode is invoked to transition to the processing in the next step ST12. When the proximity baseline threshold value in the hover mode is exceeded, the hover mode is invoked to transition to the processing in the next step ST15.

In this regard, when the touch mode is invoked to transition to the processing of the next step ST12, processing of subsequent steps ST12-ST14 is the same as the processing described in Embodiment 2 described above. Thus, the explanation thereof is omitted herein.

A case in which the hover mode is invoked to transition to the processing of the next step ST15 is explained in detailed with comparison to the case of the touch mode.

In the case of the touch mode according to Embodiment 3, there is step ST12 for determining the size of a touch object (pointer) by size determination processing of the touch object (pointer) of the next step ST12. However, in a case of the hover mode according to Embodiment 3, processing does not change depending on the size of a touch object (pointer). Thus, this step does not exist. Further, in the case of the touch mode according to Embodiment 3, there is a step for switching the number of sub-sensors (sub-lines) to be used depending on the size of a touch object (pointer) in the next step ST13. However, in a case of the hover mode according to Embodiment 3, processing does not change depending on the size of a touch object (pointer). Thus, the step for switching the number of sub-sensors (sub-lines) to be used does not exist.

Thus, a circuit for switching a sub-sensor, which is needed in a case of the touch mode according to Embodiment 3, is not needed in a case of the hover mode according to Embodiment 3. Specifically, in the sensor size switching section 11B shown in FIG. 7 and the amplifying circuit 121B for changing feedback capacitance in response to the switching in a sub-sensor shown in FIG. 8, the switches S4 and S4', the switches S6 and S6' used in changing feedback capacitance and the capacitances C1 and C4 are not required. Only the operational amplifier 121b is required. Further, for connection of the sense lines SL, only three lines consisting of a sense electrode pattern with 1/2 the electrode size shown by mesh, a sense electrode pattern with 1/2 the electrode size shown by diagonal lines, and a sense electrode pattern with 1/2 the electrode size shown with a brick pattern need to be connected by a switching means.

For this reason, when it is determined by step ST11 that a proximity operation is performed to the touch sensor panel 10B1 by hovering, proximity position detecting processing is performed by step ST15.

According to Embodiment 3 from the above, when a sense electrode pattern is divided into two and is switchable, which is an example of electrode connection in the above-described Embodiment 2 , a mode can be switched from said mode to enhance detection sensitivity by simultaneously using a plurality of divided sense lines.

(Embodiment 4)

The above-described Embodiment 3 explains a case of having a touch mode and a hover mode in addition to the configuration of Embodiment 2 described above and simultaneously using a plurality of divided sub-sense lines exceeding the electrode size prior to division without any space between the lines with excellent detection sensitivity. However, Embodiment 4 explains a case of having a touch mode and a hover mode in addition to the configuration of Embodiment 2 described above and simultaneously using a plurality of divided sub-sense lines exceeding the electrode size prior to division while spacing apart the lines by a predetermined interval with excellent detection sensitivity.

Figure 11:
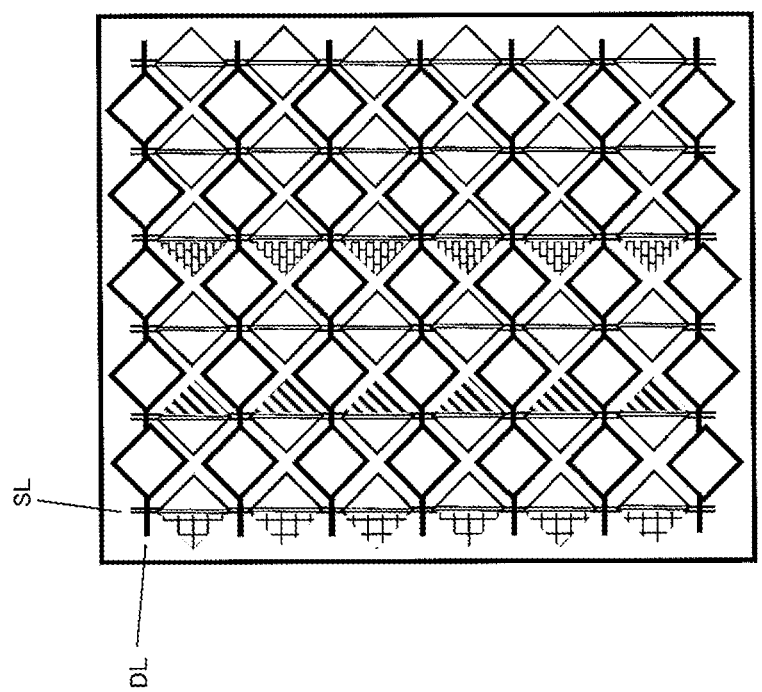
FIG. 11 is a partial plan view showing an example of a shape of electrodes and an example of electrode selection of drive lines DL and sense lines SL in a touch panel of Embodiment 4 of the present invention.

FIG. 11 is a partial plan view showing an example of a shape of an electrode and an example of electrode selection of drive lines DL and sense lines SL in a touch panel 10B2 of Embodiment 4 of the present invention. FIG. 11 is a case in which the shape of an electrode is the same triangular shape in a plan view divided into two as the shape of the electrode in FIG. 6(*a*) and FIG. 6(*b*), but three 1/2 lines are provided as a set while spacing apart the lines from one another by a predetermined interval when simultaneously using a plurality of divided sub-sense lines. Herein, only a set of three 1/2 lines of sense electrode patterns is shown by mesh, diagonal line, and brick patterns as an example of electrode selection.

As shown in FIG. 11, in a plurality of divided sense lines SL in a touch panel 10B2 in Embodiment 4, three lines consisting of a sense electrode pattern with 1/2 the electrode size shown by mesh, a sense electrode pattern with 1/2 the electrode size shown by diagonal lines, and a sense electrode pattern with 1/2 the electrode size shown by a brick pattern are spaced apart between the lines by a predetermined interval (two sub-line interval). In this manner, for connection of the sense lines SL, each position of the three lines consisting of a sense electrode pattern with 1/2 the electrode size shown by mesh, a sense electrode pattern with 1/2 the electrode size shown by diagonal lines and a sense electrode pattern with 1/2 the electrode size shown by a brick pattern is spaced apart, whereby there is an effect of facilitating the observation of a change in capacitance expanded in a wider range.

Specifically, when attempting to detect a subject at a further distance in a case of proximity detection for hovering, a change in capacitance expands in a spatially wide range. Thus, there are cases in the above-described Embodiment 3 with sub-lines that are not spaced apart from one another, specifically sub-lines that are adjacent to each other, where it is difficult to detect a change in capacitance when using a method of detecting a subject by a difference in sub-lines. For this reason, there is an effect of facilitating the observation of a change in capacitance expanded in a wide range by spacing apart sub-lines by a predetermined interval, specifically by observing the difference between sub-lines at a further distance.

Figure 12:
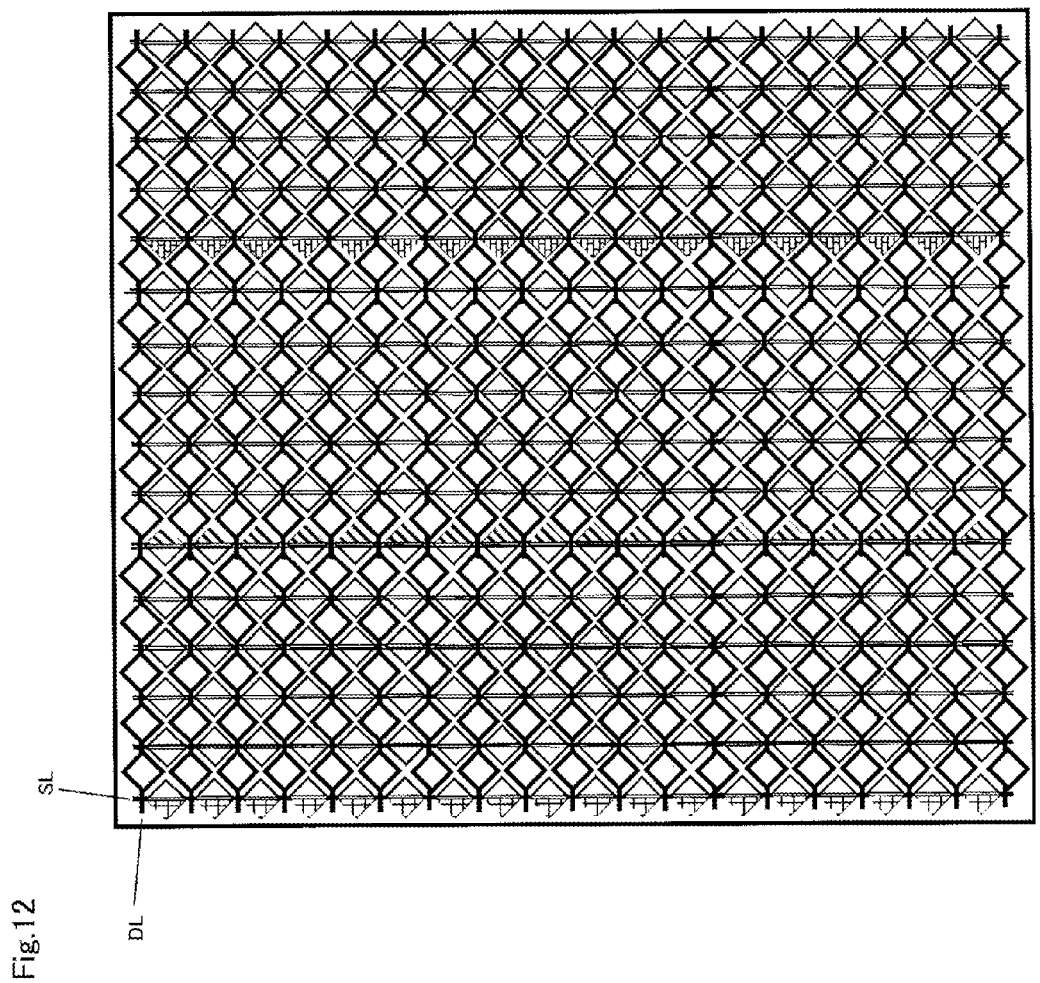
FIG. 12 is a partial plan view showing a variant of the example of a shape of electrodes and example of electrode selection of drive lines DL and sense lines SL in the touch panel of FIG. 11.

Further, regarding the above-described effect, in order to disclose an example of application to a large touch sensor panel, FIG. 12 attempts to detect a subject at a further distance by spacing apart the sub-lines from one another by a predetermined interval (10 sub-lines) when simultaneously using a plurality of sub-lines of the plurality of divided sense lines SL exceeding the electrode size prior to division at high sensitivity, similarly to a case of spacing apart by a predetermined interval (two sub-lines) of FIG. 11. The difference between FIG. 12 and FIG. 11 is the number of sub-lines in a predetermined interval and whether a subject at a further distance can be readily detected.

In FIG. 12, the number of drive lines DL and sense lines SL is increased and the space between the sub-lines of the sense lines SL to be used simultaneously is expanded to 10 sub-lines. Similarly to the case of the above-described Embodiment 3, position detection processing can be carried out even when each position of three lines (sub-lines) consisting of a sense electrode pattern with 1/2 the electrode size shown by mesh, a sense electrode pattern with 1/2 the electrode size shown by diagonal lines and a sense electrode pattern with 1/2 the electrode size shown by a brick pattern is altered to be spaced apart for connection of the sense lines SL.

The interval between the sub-lines of the sense lines SL to be used simultaneously is 10 sub-lines in FIG. 11. However, the present invention is not limited thereto. For example, the interval may be 20 sub-lines. In summary, regarding simultaneously using a plurality of divided sub-drive lines and/or sub-sense lines, when using the plurality of sub-drive lines and/or sub-sense lines and the lines are used while being spaced apart from one another, the interval between the lines may be any of 1-20 lines.

Herein, a further variant of the above-described Embodiments 3 and 4 is explained.

Figure 13:
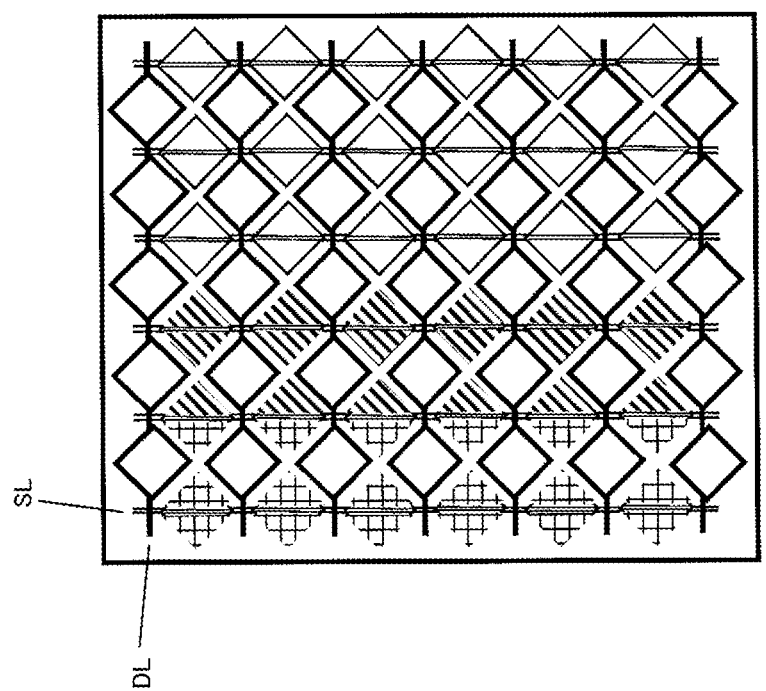
FIG. 13 is a partial plan view showing an example of a shape of electrodes and an example of electrode selection of drive lines DL and sense lines SL of a touch panel in a variant of Embodiment 3 of the present invention.

FIG. 13 is a partial plan view showing an example of a shape of an electrode and an example of electrode selection of drive lines DL and sense lines SL of a touch panel 10B3 in a variant of Embodiment 3 of the present invention. FIG. 13 is a case in which the shape of an electrode is the same triangular shape in a plan view divided into two as the shape of the electrode in FIG. 6(a) and FIG. 6(b), but six consecutive 1/2 lines are provided without any space between the lines as a set when a plurality of divided sub-sense lines are used simultaneously. Herein, only a set of six consecutive 1/2 lines of sense electrode patterns is shown by a mesh and diagonal lines as an example of electrode selection.

As shown in FIG. 13, a touch panel 10B3 simultaneously uses the plurality of divided sense lines SL exceeding the electrode size prior to division without spacing apart the lines from one another, similarly to the case of the above-described Embodiment 3. The difference between the touch panel 10B1 of FIG. 9 and the touch panel 10B3 of FIG. 13 is that the number of sub-lines of divided electrodes is 3 lines in FIG. 9, whereas it is six lines consisting of sense electrode patterns with 1/2 the electrode size shown by mesh and sense electrode patterns with 1/2 the electrode size shown by diagonal lines in FIG. 13. Similarly to the case of the above-described Embodiment 3, proximity position detection processing can be carried out even when positions of six consecutive lines consisting of sense electrode patterns with 1/2 the electrode size shown by mesh and sense electrode patterns with 1/2 the electrode size shown by diagonal lines are altered to connect to each other without spacing apart the lines from one another as a set, for connection of the sense lines SL.

For comparison with FIG. 13, three lines of a sense electrode pattern with 1/2 the electrode size shown by mesh and three lines of a sense electrode pattern with 1/2 the electrode size shown by diagonal lines can be disposed while being separated a predetermined interval, herein the amount of two lines. This is shown in FIG. 14.

Figure 14:
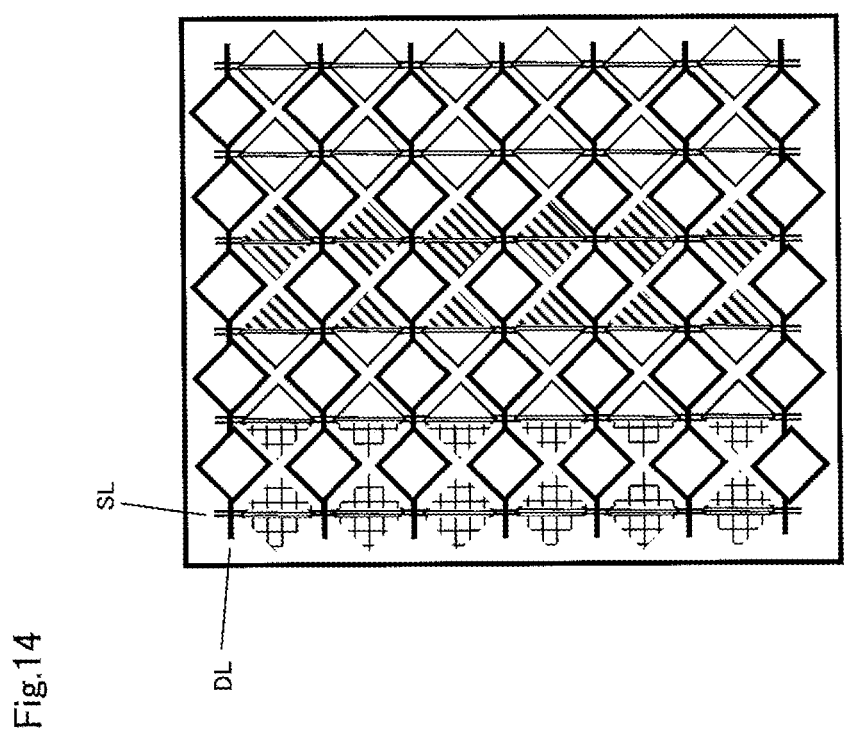
FIG. 14 is a partial plan view showing an example of a shape of electrodes and an example of electrode selection of drive lines DL and sense lines SL of a touch panel in a variant of Embodiments 3 and 4 of the present invention.

FIG. 14 is a partial plan view showing an example of a shape of an electrode and an example of electrode selection of drive lines DL and sense lines SL of a touch panel 10B4 in a variant of Embodiments 3 and 4 of the present invention. FIG. 14 is a case in which the shape of an electrode is the same triangular shape in a plan view divided into two as the shape of the electrode in FIG. 6(a) and FIG. 6(b), but six 1/2 lines are provided as a set while being spaced apart between the lines by a predetermined interval when a plurality of divided sub-sense lines are used simultaneously. Herein, only a set of six 1/2 lines of sense electrode patterns is shown by a mesh and diagonal line as an example of electrode selection.

The difference between the touch panel 10B3 of FIG. 13 and a touch panel 10B4 of FIG. 14 is that three lines of a sense electrode pattern with 1/2 the electrode size shown by mesh and three lines of a sense electrode pattern with 1/2 the electrode size shown by diagonal lines are each used consecutively without being spaced apart in FIG. 13, whereas FIG. 14 uses the lines that are spaced apart (herein, interval of the amount of two lines). Similarly to the cases of the above-described Embodiments 3 and 4, proximal position detection processing can be carried out with an expanded range by altering the positions of three lines of sense electrode patterns with 1/2 the electrode size shown by mesh and three lines of sense electrode patterns with 1/2 the electrode size shown by diagonal lines to positions that are spaced apart by the amount of two lines therebetween for connection of the sense lines SL.

Figure 15:
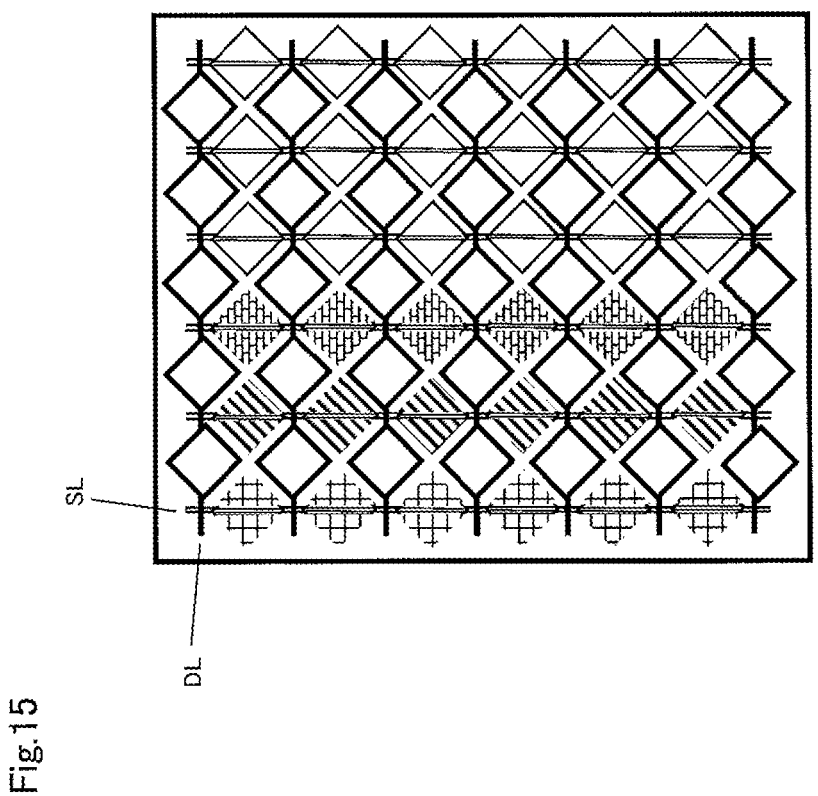
FIG. 15 is a partial plan view showing an example of a shape of electrodes and an example of electrode selection of drive lines DL and sense lines SL of a touch panel in a variant of Embodiment 3 of the present invention.

FIG. 15 is a partial plan view showing an example of a shape of an electrode and an example of electrode selection of drive lines DL and sense lines SL of the touch panel 10B3 in a variant of Embodiment 3 of the present invention. FIG. 15 is a case in which the shape of an electrode is the same triangular shape in a plan view divided into two as the shape of the electrode in FIG. 6(a) and FIG. 6(b), but six consecutive 1/2 lines are provided as a set without any space between the lines when a plurality of divided sub-sense lines are used simultaneously. Herein, only a set of six consecutive 1/2 lines of sense electrode patterns is shown by a mesh, diagonal lines and brick patterns as an example of electrode selection.

As shown in FIG. 15, positions of six lines are the same except the pattern of electrodes is different from the aforementioned touch panel 10B3 in FIG. 13. Six lines of divided electrode lines are shown with six lines consisting of sense electrode patterns with 1/2 the electrode size shown by mesh, sense electrode patterns with 1/2 the electrode size shown by diagonal lines and sense electrode patterns with 1/2 the electrode size shown with a brick pattern. Similar to the case of the above-described Embodiment 3 (FIG. 13), proximity position detection processing can be carried out with enhanced sensitivity by using consecutive positions of six lines consisting of sense electrode patterns with 1/2 the electrode size shown by mesh, sense electrode patterns with 1/2 the electrode size shown by diagonal lines and sense electrode patterns with 1/2 the electrode size shown by a brick pattern for connection of the sense lines SL.

Figure 16:
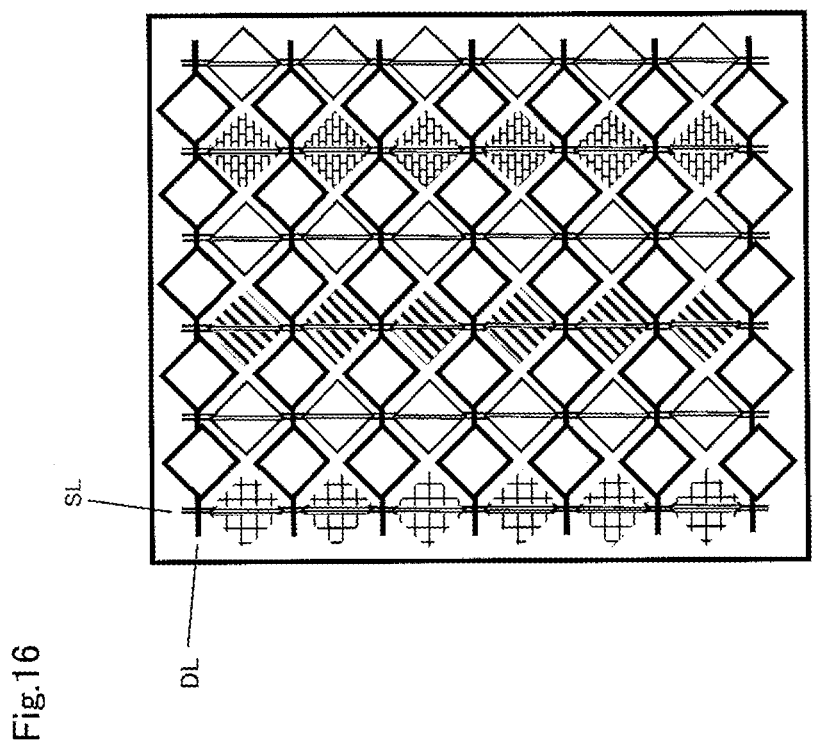
FIG. 16 is a partial plan view showing an example of a shape of electrodes and an example of electrode selection of drive lines DL and sense lines SL of a touch panel in a variant of Embodiments 3 and 4 of the present invention.

This is explained for comparison with the following FIG. 16. FIG. 16 is shown by separating the lines into two sense electrode patterns with 1/2 the electrode size shown by mesh, two sense electrode patterns with 1/2 the electrode size shown by diagonal lines, and two sense electrode patterns with 1/2 the electrode size shown by a brick pattern. The following FIG. 16 shows each of these lines that is spaced apart therebetween by a predetermined interval.

FIG. 16 is a partial plan view showing an example of a shape of an electrode and an example of electrode selection of drive lines DL and sense lines SL of a touch panel 10B5 in a variant of Embodiments 3 and 4 of the present invention. FIG. 16 is a case in which the shape of an electrode is the same triangular shape in a plan view divided into two as the shape of the electrode in FIG. 6(*a*) and FIG. 6(*b*), but six 1/2 lines are provided as a set while being spaced apart between the lines by a predetermined interval when a plurality of divided sub-sense lines are used simultaneously. Herein, only a set of six 1/2 lines of sense electrode patterns is shown by a mesh, diagonal lines and a brick pattern as an example of electrode selection.

As discussed previously, the difference between the touch panel 10B3 of FIG. 15 and the touch panel 10B5 of FIG. 16 is that FIG. 15 uses two sense electrode patterns with 1/2 the electrode size shown by mesh, two sense electrode patterns with 1/2 the electrode size shown by diagonal lines and two sense electrode patterns with 1/2 the electrode size shown by a brick pattern are each used consecutively without being spaced apart, whereas FIG. 16 uses the lines that are each spaced apart. Similarly to the above-described Embodiment 4, proximal position detection processing can be carried out with an expanded range by altering the positions of two sense electrode patterns with 1/2 the electrode size shown by mesh, two sense electrode patterns with 1/2 the electrode size shown by diagonal lines, and two sense electrode patterns with 1/2 the electrode size shown by a brick pattern to positions that are spaced apart between the lines by a predetermined interval for connection of the sense lines SL.

Although it is not particularly explained in the above-described Embodiments 3 and 4, when simultaneously using a plurality of divided lines exceeding the electrode size prior to division, the electrode size is switchable to 1/2, 2/2, 3/2, 4/2, 5/2, 6/2 ... [number of constituent lines×2]/2 with respect to all sizes of an electrode divided into two. Herein, the number of constituent lines is the number of lines when lines are not divided. In the case of FIG. 9, the number is 1.5 lines and in the case of FIG. 13, the number is three lines. The case of division into four of the above-described Embodiment 1 and the case of division into nine of Embodiment 5 described below are similar. The electrode size is switchable to 1/4, 2/4, 3/4, 4/4, 5/4, 6/4 ... [number of constituent lines×4]/4 with respect to all sizes of an electrode divided into four. In addition, the electrode size is switchable to 1/9, 2/9, 3/9, 4/9, 5/9, 6/9, 7/9, 8/9, 9/9, 10/9, 11/9, 12/9 ... [number of constituent lines×9]/9 with respect to all sizes of an electrode divided into nine. In this manner, it is possible in FIGS. 13-16 to detect a position with high sensitivity by using the plurality of divided sense lines SL at an amount of the original one line or greater, i.e., while exceeding the electrode size prior to division, for example 1.5 lines.

The above-described Embodiments 3 and 4 describe a case in which, when sense electrode patterns are divided into two and switchable as an example of electrode connection (example of electrode selection) in the above-described Embodiment 2, the plurality of divided sense lines SL exceeding the electrode size prior to division are simultaneously used by switching from a mode. However, the present invention is not limited thereto. As an example of electrode connection in the above-described Embodiment 2, when the sense electrode pattern is divided into two and switchable, it is possible to simultaneously use a plurality of divided sub-sense lines without switching a mode therefrom.

The above-described Embodiments 3 and 4 describe a case in which the sense lines SL are clearly divided. However, the present invention is not limited thereto. Proximity position detection processing or high sensitivity touched position detection processing can also be executed as in the above-described Embodiments 3 and 4 in cases where sense lines are not openly divided.

(Embodiment 5)

The above-described Embodiment 1 explains a case in which the shape of a sense pattern is quadrangular (square) as an example of the shape of an electrode and the sense pattern is divided into four so that the minimum switchable electrode size includes 1/4. In addition, the above-described Embodiment 2 explains a case in which the shape of a sense pattern is triangular (square) as an example of the shape of an electrode and the sense pattern is divided into two so that the minimum switchable electrode size includes 1/2. However, Embodiment 5 explains a case in which the shape of a sense pattern is quadrangular (square) as an example of the shape of an electrode and the sense pattern is divided into nine so that the minimum switchable electrode size includes 1/9.

In FIG. 1, a sensor size switching section 11C is provided between a plurality of sense lines SL and a touched position detecting section 120C, and the electrode size of a square (or rhombus) sense electrode pattern in a plan view is switched between at least two electrode sizes of large and small.

Further, the minimum electrode size is herein 1/9 of the large electrode size because a sense electrode pattern is divided into nine.

The sensor size switching section 11C has a size switching controlling section (not shown) for controlling switching between at least two electrode sizes of large and small in accordance with the size of a pointer in contact with or in the proximity of the surface of a touch sensor panel 10C. The size switching controlling section switches to a small electrode size for pointers in contact with or in the proximity of the surface of the touch sensor panel 10C with a larger size, and switches to a large electrode size for pointers in contact with or in the proximity of the surface thereof with a smaller size. Furthermore, the size switching controlling section that is not shown is configured to switch feedback capacitance of an amplifier, amplifying circuit 121C, in response to the switching of the sensor size switching section 11C.

Figure 17:
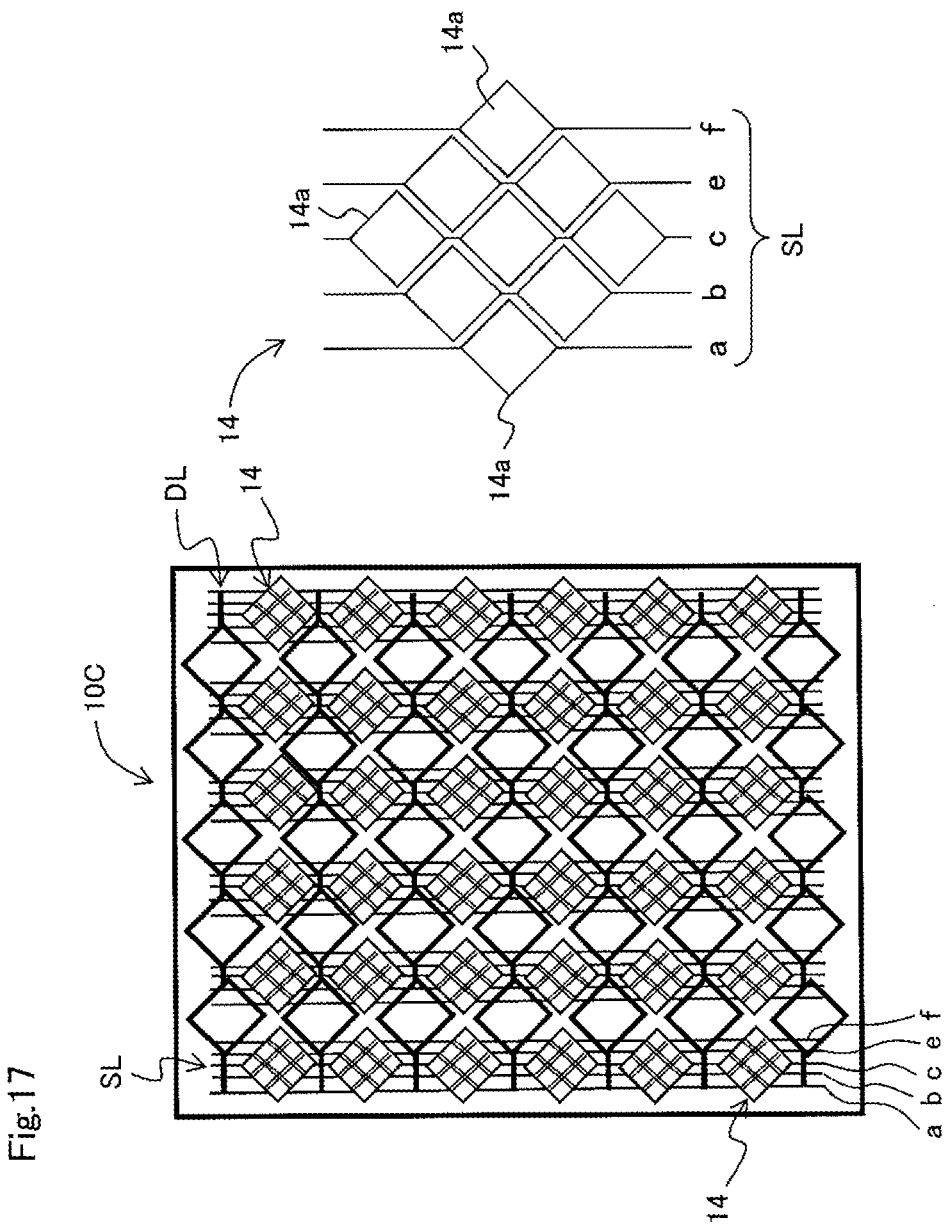
FIG. 17 is a partial plan view showing an example of a shape of electrodes of drive lines DL and sense lines SL in the touch panel in Embodiment 3 of the present invention, and 17 is an enlarged view of a unit electrode shape.

FIG. 17(*a*) is a partial plan view showing an example of a shape of an electrode of drive lines DL and sense lines SL in the touch panel 10C in Embodiment 3 of the present invention. FIG. 17(*b*) is an enlarged view of a unit electrode shape of FIG. 17(*a*). Constituent members achieving the same working effect as the constituent members of FIG. 1 are explained while being assigned with the same reference numeral.

In FIG. 17(*a*) and FIG. 17(*b*), an electrode is divided into nine quadrangular sub-sense electrode patterns 14*a* with 1/9 the size of the electrode of a sense electrode pattern of sense lines SL. The sense electrode pattern is divided into nine as a two dimensional capacitor array consisting of transparent electrodes. The nine sub-sense electrode patterns 14*a* constitute a sense electrode pattern 14 with the maximum electrode size.

Specifically, in the touch sensor panel 10C, the sense lines SL are formed in a longitudinal direction and drive lines DL are formed in the transverse direction. A sense electrode pattern of the sense lines SL is comprised of nine single units of quadrangular shapes. This is used differently in that the configuration is used when the size of a pointer for a touch operation is larger in comparison to the case in FIG. 1.

In this manner, it is also possible to reduce power consumption of the touch sensor panel 10C while maintaining detection precision and to provide a touch panel system 1C using the touch sensor panel 10C and an electronic equipment using the same in Embodiment 3.

The difference between the touch panel system 1C of Embodiment 3 and the conventional touch panel system 100 of FIG. 21 is in having the sensor size switching section 11C for switching the electrode size of a sense electrode pattern between at least two electrode sizes of large and small and the amplifying circuit 121C for changing feedback capacitance of an amplifier in response to the switching. The sensor size switching section 11C is explained in detail by using FIG. 18. The amplifying circuit 121C is explained in detail by using FIG. 19.

(Switching of Electrode Size by Sensor Size Switching Section 11C)

Figure 18:
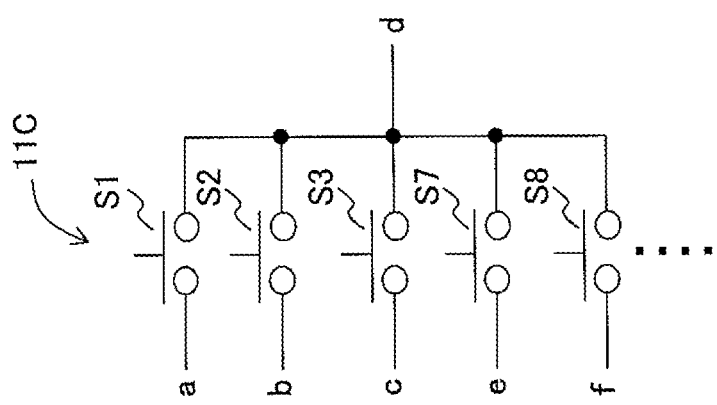
FIG. 18 is a circuit diagram showing an example configuration of a sensor size switching section of FIG. 17.

FIG. 18 is a circuit diagram showing an example configuration of the sensor size switching section 11C of FIG. 17.

FIG. 18 shows a configuration of the sensor size switching section 11C corresponding to a group of sub-sense lines SL (five sub-sense lines a, b, c, e and f of FIG. 17). The same number of the groups is comprised as the number of the sense lines SL.

In the sensor size switching section 11C, each of switches S1-S3, S7 and S8 is provided on the five sub-sense lines a, b, c, e and f. At least one of the five sub-sense lines a, b, c, e and f is connected via at least one of the switches S1-S3, S7 and S8.

(Switching of Feedback Capacitance of Amplifying Circuit 121C)

Figure 19:
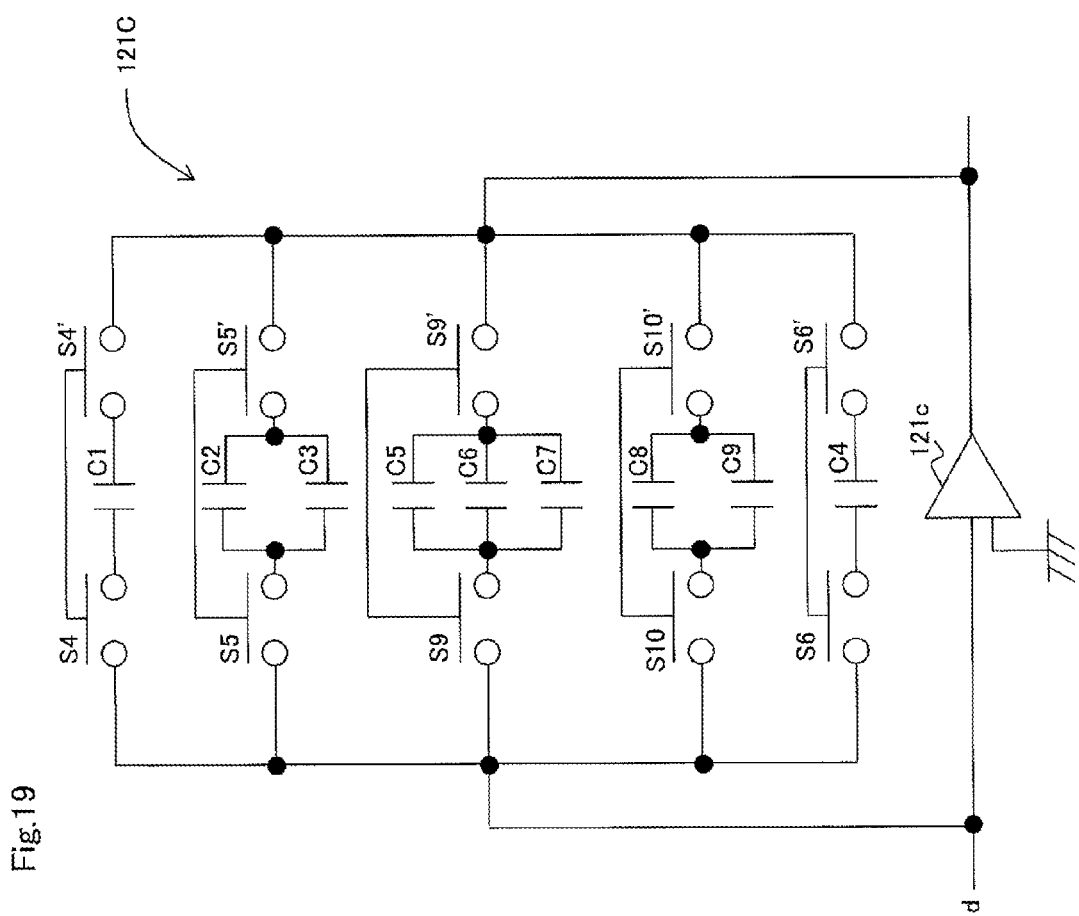
FIG. 19 is a circuit diagram showing a third example configuration of the amplifying circuit of FIG. 1.

FIG. 19 is a circuit diagram showing the third example configuration of the amplifying circuit 121C of FIG. 1.

In FIG. 19, the amplifying circuit 121C comprises an operational amplifier 121c connected to a common switch d of the sensor size switching section 11C. Feedback capacitance of the operational amplifier 121c can be changed. Feedback capacitance C1-C9 is the same size capacitance. The operational amplifier 121c is connected as feedback capacitance by switches S4 and S4', S5 and S5', S6 and S6', S9 and S9' or S10 and S10'. The switches S4 and S4' turn on or off in concert, the switches S5 and S5' turn on or off in concert, the switches S6 and S6' turn on or off in concert, the switches S9 and S9' turn on or off in concert and the switches S10 and S10' turn on or off in concert. At least one of the capacitance C1, the capacitance C4, the capacitance C2+C3, the capacitance C8+C39 and the capacitance C5+C6+C7 is connected thereby to both ends of the operational amplifier 1210 as feedback capacitance of the operational amplifier 121c.

Each control terminal of the switches S1-S3, S7 and S8 of FIG. 18 and the switches S4 and S4', S5 and S5', S6 and S6', S9 and S9' or S10 and S10' of FIG. 19 are controlled to turn on or off by a control signal from a host terminal 105.

When the sensor size is to be 1/9, the above-described control operation turns on only the switch S1 and turns on only the switches S4 and S4' of the operational amplifier 121c to connect the capacitance C1 as feedback capacitance to both ends of the operational amplifier 1210.

When the sensor size is to be 2/9, only the switch S2 is turned on and only the switches S5 and S5' of the operational amplifier 121c are turned on to connect a parallel circuit of the capacitances C2 and C3 as feedback capacitance to both ends of the operational amplifier 121c.

When the sensor size is to be 3/9, only the switch S3 is turned on and only the switches S9 and S9' of the operational amplifier 121c are turned on to connect a parallel circuit of the capacitances C5-C7 as feedback capacitance to both ends of the operational amplifier 121c.

When the sensor size is to be 4/9, the switches S2 and S7 are turned on and the switches S5 and S5' and the switches S10 and S10' of the operational amplifier 121c are turned on to connect a parallel circuit of the capacitances C2 and C3 and the capacitances C8 and C9 as feedback capacitance to both ends of the operational amplifier 121c.

When the sensor size is to be 5/9, the switches S2 and S3 are turned on and the switches S5 and S5' and the switches S9 and S9' of the operational amplifier 121c are turned on to connect a parallel circuit of the capacitances C2 and C3 and capacitances C5-C7 as feedback capacitance to both ends of the operational amplifier 121c.

When the sensor size is to be 6/9, the switches S1-S3 are turned on and the switches S4 and S4', S5 and S5' and S9 and S9' of the operational amplifier 1210 are turned on to connect a parallel circuit of the capacitances C1-C3 and capacitances C5-C7 as feedback capacitance to both ends of the operational amplifier 121c.

When the sensor size is to be 7/9, the switches S1-S3 and S8 are turned on and the switches S4 and S4' to S6 and S6' and S9 and S9' of the operational amplifier 121c are turned on to connect the capacitances C1-C4 and capacitances C5-C7 as feedback capacitance to both ends of the operational amplifier 1210.

When the sensor size is to be 8/9, the switches S1-S3 and S7 are turned on and the switches S4 and S4', S5 and S5' and S9 and S9' of the operational amplifier 121c are turned on to connect the capacitances C1-C3 and capacitances C5-C9 as feedback capacitance to both ends of the operational amplifier 121c.

When the sensor size is to be 9/9, the switches S1-S3, S7 and S8 are all turned on and the switches S4 and S4' to S6 and S6', S9 and S9' and S10 and S10' of the operational amplifier 121c are turned on to connect the capacitances C1-C4 and capacitances C5-C9 as feedback capacitance to both ends of the operational amplifier 121c.

By the above-described switching, feedback capacitance can be 1/9 when the sensor size is 1/9, feedback capacitance can be 2/9 when the sensor size is 2/9, and feedback capacitance can be 3/9 when the sensor size is 3/9 to obtain feedback capacitance of the operational amplifier 121c in a size corresponding to the sensor size. For this reason, load capacitance of the operational amplifier 121c can be smaller when the sensor size is small. Thus, power consumption can be further reduced.

With the configuration described above, the operation of the touch panel system 1C of Embodiment 3 is explained in detail by using the flow chart of FIG. 5, similarly to the case of the touch panel system 1 of the above-described Embodiment 1.

FIG. 5 is a flow chart for explaining the operation of the touch panel system 1C of Embodiment 3 in FIG. 1.

As shown in FIG. 5, first, it is detected whether a touch operation has been performed on the touch sensor panel 10C in step ST1. Specifically, it is determined whether a touch detection value exceeds a touch baseline threshold in step ST1. In step ST1, the system waits until the touch detection value exceeds the touch baseline threshold. When it is determined that the touch detection value exceeds the touch baseline threshold and that a touch operation has been performed (YES in step ST1), the operation transitions to the processing of the next step ST2.

Next, the size of a pointer is determined in step ST2.

Subsequently, the number of divided electrodes, which are sub-sense electrode patterns to be used, is switched in accordance with the size of the pointer in step ST3.

As stated above, when an object in contact with or in the proximity of the touch sensor panel 10C is large, sensing processing is performed by activating, for example, one out of nine units (this can be set at any value) of the sub-sense electrode pattern 14a of the sensing sub-sense lines with the sensor size switching section 11 for switching the sensor size when, for example, the sensing signal level is over 75% of the estimated maximum value, or by activating, for example, four out of nine units (this can be set at any value) of the sensing sub-sense electrode patterns 14a with the sensor size switching section 11 for switching the sensor size when, for example, the sensing signal level is over 50% but under 75% of the estimated maximum value, or by activating, for example, six out of nine units (this can be set at any value) of the sensing sub-sense electrode patterns 14a with the sensor size switching section 11 for the switching sensor size when, for example, the sensing signal level is under 50% of the estimated maximum value. Touched position detection processing of step ST4 is then performed.

According to Embodiment 3 from the above, in the touch sensor panel 10C for inputting a position by a touch operation to a predetermined region, the plurality of drive lines DL disposed in one direction and the plurality of sense lines SL disposed in another direction intersect each other and the electrode size of an electrode of a sense pattern in one direction (sense electrode pattern) disposed between adjacent intersections is switched between at least two electrode sizes of large and small.

Thereby, since the large electrode size is the conventional electrode size, power consumption can be further reduced due to an electrode size being small without affecting detection precision, even when switching to a small electrode size when a pointer such as a fingertip is large. In this case, detection precision of a touched position can be maintained because sampling scan is not performed as in the conventional technique.

The above-described Embodiments 1-3 explain a case in which an electrode of the sense lines SL is divided into a plurality of portions constituting a plurality of sub-sense lines and at least one of the plurality of sub-sense lines is configured to be switchable or selectable. However, the present invention is not limited thereto. Similarly to an electrode of the sense lines SL, an electrode of the drive lines DL may be divided into a plurality of portions constituting a plurality of sub-sense lines and at least one of the plurality of sub-sense lines is configured to be switchable or selectable.

In summary, at least one of the electrode of the drive lines DL and the electrode of the sense lines SL may be divided into a plurality of portions constituting a plurality of sub-sense lines or a plurality of sub-drive lines and at least one of the plurality of sub-sense lines and the plurality of sub-drive lines is configured to be switchable or selectable. Accordingly, the electrode size is configured to be switchable between at least two electrode sizes of large and small for at least one of the electrode of the drive lines in one direction and the electrode of the sense lines in another direction, wherein the plurality of drive lines disposed in one direction and the plurality of sense lines disposed in another direction intersect each other.

In the above-described Embodiments 1-3, each electrode of a drive electrode pattern and a sense electrode pattern is comprised of a transparent electrode. Further, the material of the transparent electrode is made of ITO (Indium-Tin-Oxide).

Further, each electrode of a drive electrode pattern and a sense electrode pattern may be comprised of a metal mesh.

The above-described Embodiments 1-3 explain a case in which at least one of the electrode of the drive lines DL and the electrode of the sense lines SL is divided into two, four or nine to form a plurality of sub-drive lines and/or a plurality of sub-sense lines, and at least one of the plurality of sub-drive lines and the plurality of sub-sense lines is switchable by a switching circuit. However, the present invention is not limited thereto. At least one of the electrode of the drive lines DL and the electrode of the sense lines SL may be divided into a plurality of portions constituting a plurality of sub-drive lines and/or the plurality of sub-sense lines and at least one of the plurality of sub-drive lines and the plurality of sub-sense lines is configured to be switchable or selectable by a switching circuit.

In the above-described Embodiments 1-3, the small electrode size is an electrode size that is 1/9 or more and 8/9 or less of the maximum electrode size. Specifically, the small electrode size is 1/2 in cases of dividing into 2, 1/4 in cases of dividing into 4, and 1/9 in cases of dividing into 9. Meanwhile, the maximum size among the large electrode sizes corresponds to half the size of maximum electrode region within four intersections adjacent to one another. The maximum electrode size is the conventional electrode size, and with this as the baseline, power consumption is reduced by switching to a smaller electrode size.

In the above-described Embodiments 1-3, the touch sensor panel 10, 10B or 10C is provided on the front surface of a display device as an electronic equipment. The present invention can be applied to the display device, regardless of the type, such as a liquid crystal display, plasma display, organic EL display and FED display. It is also possible for other electronic equipment such as a mobile phone device to comprise the touch panel system 10, 10B or 10C according to the above-described Embodiments 1-3. This is shown as an example of the following electronic equipment.

(Embodiment 4)

Figure 20:
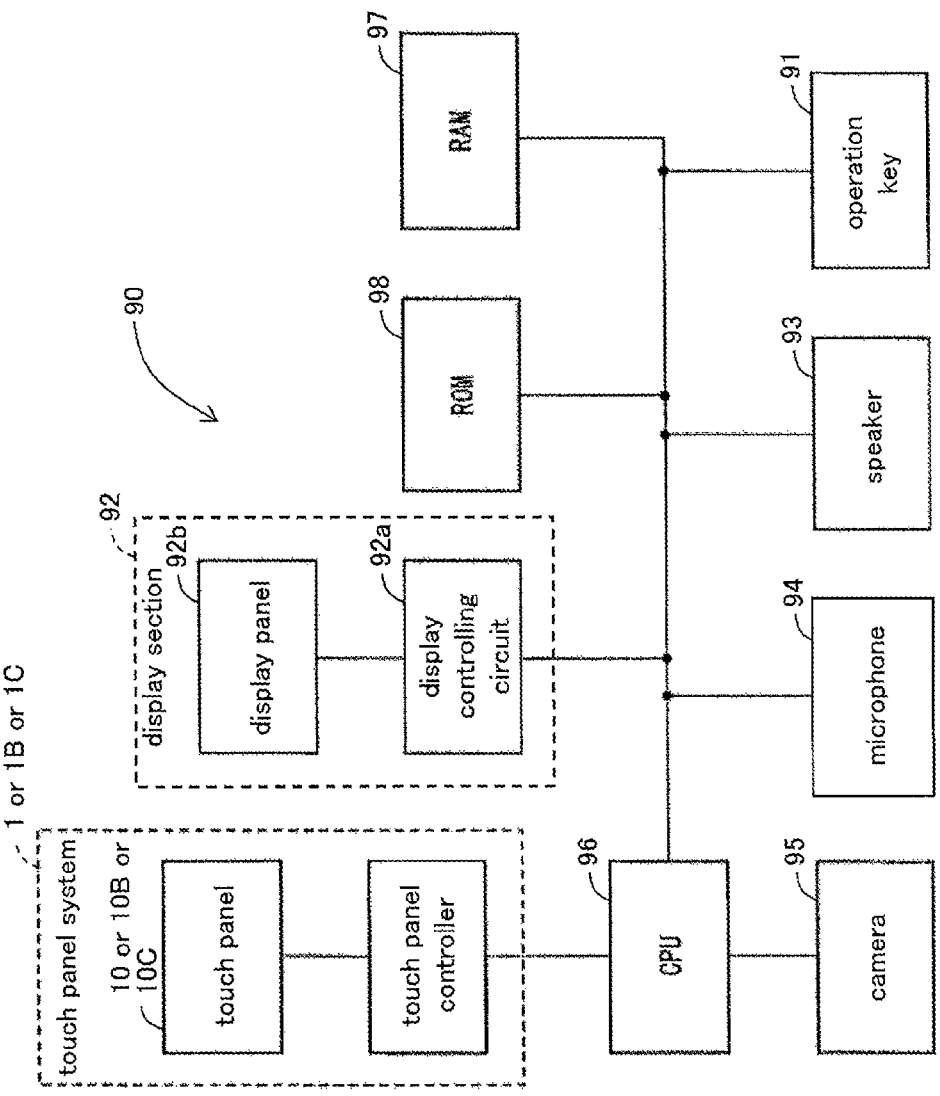
FIG. 20 is a block diagram showing a schematic example configuration of an electronic equipment such as a mobile phone device using a touch panel system of Embodiments 1-3 of the present invention as Embodiment 4 of the present invention.

FIG. 20 is a block diagram showing a schematic example configuration of an electronic equipment such as a mobile phone device using the touch panel system 1, 1B, 1B1, 1B2, 1B3, 184, 1B5 or 1C of Embodiments 1-5 of the present invention as Embodiment 6 of the present invention.

In FIG. 20, an electronic equipment 90 of Embodiment 3 is constituted with a computer system and comprises: the touch panel system 1, 1B, 1B1, 1B2, 1B3, 1B4, 1B5 or 1C of Embodiments 1-3 described above; an operation key 91 allowing various input commands such as a keyboard or a mouse; a display section 92 enabling the display of various images, such as an initial screen, selection screen and processing screen, on a display screen in accordance with the various input commands; a speaker 93; a microphone 94; a camera 95; a CPU 96 (central processing unit) as a controlling section for performing overall control; RAM 97 as a temporary storing means functioning as a working memory at start-up of the CPU 96 and ROM 98; as a computer readable recording medium (storing means) recorded with control program for operating the CPU 96; a variety of data used therefor and the like.

Herein, a touch panel controller comprises a sensor size switching section 11 (or 11B or 11C), a host terminal 105, a drive line driving section 110 and a touched position detecting section 120A (or 120B or 120C).

The ROM 98 is comprised of a readable recording medium (storing means) such as a hard disk, optical disk, magnetic disk or IC memory. The control program and the variety of data used therefor may be downloaded to the ROM 98 from a portable optical disk, magnetic disk, IC memory or the like, or a hard disk of a computer, or downloaded to the ROM 98 from a hard disk, or downloaded to the ROM 98 through a wireless or wired connection, Internet or the like.

For example, mobile phone devices, such as a mobile phone device with a camera, and mobile terminal devices are contemplated as the electronic equipment 90. Mobile terminal devices include smartphones, tablets, PC monitors, signage, electronic black boards, information displays and the like.

As described above, the present invention is exemplified by the use of its preferred Embodiments 1 to 6 of the present invention. However, the present invention should not be interpreted solely based on Embodiments 1 to 6. It is understood that the scope of the present invention should be interpreted solely based on the scope of the claims. It is also understood that those skilled in the art can implement equivalent scope of technology, based on the description of the present invention and common knowledge from the description of the detailed preferred Embodiments 1 to 6 of the present invention. Furthermore, it is understood that any patent, any patent application and any references cited in the present specification should be incorporated by reference in the present specification in the same manner as the contents are specifically described therein.

INDUSTRIAL APPLICABILITY

The present invention can be applied in the field of a touch sensor panel which is a position inputting device installed on a display screen of a display device, a touch panel system for detecting using the same, and electronic equipment using the same. Accordingly to the present invention, the electrode size of at least one of electrodes of drive lines in one direction and electrodes of sense lines in another direction is configured to be switchable between at least two electrode sizes of large and small. Thus, power consumption and associated devices thereof can be made smaller while maintaining the detection precision of a touched position.

The invention claimed is:

1. A touch panel system comprising:
a touch sensor panel including:
  a plurality of drive lines arranged in one direction;
  a plurality of sense lines arranged in another direction so as to intersect with the plurality of drive lines in a plan view of the touch sensor panel;
  a plurality of drive electrodes arranged along each drive line and between adjacent intersections of the drive line and the plurality of sense lines; and
  a plurality of sense electrodes arranged along each sense line and between adjacent intersections of the sense line and the plurality of drive lines,
  each drive electrode and/or each sense electrode being divided into a plurality of sub electrodes, the touch sensor panel being configured such that one or more of the sub electrodes of the plurality of drive electrodes and/or the plurality of sense electrodes are selectively usable to make each drive electrode and/or each sense electrode switchable between at least two electrode sizes of large and small,
a touched position detecting section for estimating or detecting a capacitance value after the capacitance value of electrostatic capacitance from a plurality of sense lines of the touch sensor panel is amplified with an amplifier to detect a touched position; and
a sensor size switching section that is provided between the plurality of sense lines and the touched position detecting section and switches an electrode size of the sense lines between the at least two electrode size of large and small, wherein the sensor size switching section has a size switching controlling section for controlling switching between the at least two electrode sizes of large and small in accordance with a size of a pointer in contact with or in the proximity of a surface of the touch sensor panel.

2. The touch panel system of claim 1, wherein the size switching controlling section switches to a small electrode size for a pointer with a larger size in contact with or in the proximity of the surface of the touch sensor panel, and switches to a large electrode size for a pointer with a smaller size in contact with or in the proximity of the surface.

3. The touch panel system of claim 2, wherein the size switching controlling section switches feedback capacity of the amplifier in response to the switching of the sensor size switching section.

4. An electronic equipment using the touch panel system of claim 1 on a display screen of a display device as a position inputting device.

5. The electronic equipment of claim 4, wherein the display device is a liquid crystal display, plasma display, organic EL display or a field discharge display.

* * * * *